(12) United States Patent
de la Iglesia et al.

(10) Patent No.: US 7,689,614 B2
(45) Date of Patent: Mar. 30, 2010

(54) QUERY GENERATION FOR A CAPTURE SYSTEM

(75) Inventors: Erik de la Iglesia, Mountain View, CA (US); William Deninger, Mountain View, CA (US); Ratinder Paul Singh Ahuja, Saratoga, CA (US)

(73) Assignee: McAfee, Inc., Santa Clara, CA (US)

( * ) Notice: Subject to any disclaimer, the term of this patent is extended or adjusted under 35 U.S.C. 154(b) by 145 days.

(21) Appl. No.: 11/439,488

(22) Filed: May 22, 2006

(65) Prior Publication Data

US 2007/0271254 A1    Nov. 22, 2007

(51) Int. Cl.
*G06F 17/00* (2006.01)

(52) U.S. Cl. .................. 707/713; 707/706; 707/722; 707/736; 707/758; 707/781

(58) Field of Classification Search .............. 707/1–10, 707/100–104.1, 200–206, 600–828
See application file for complete search history.

(56) References Cited

U.S. PATENT DOCUMENTS

| | | | |
|---|---|---|---|
| 4,286,255 A | 8/1981 | Siy | |
| 4,710,957 A | 12/1987 | Bocci et al. | |
| 5,465,299 A | 11/1995 | Matsumoto et al. | |
| 5,557,747 A | 9/1996 | Rogers et al. | |
| 5,768,578 A | 6/1998 | Kirk | |
| 5,781,629 A | 7/1998 | Haber et al. | |
| 5,794,052 A | 8/1998 | Harding | |
| 5,943,670 A | 8/1999 | Prager | |
| 5,995,111 A | 11/1999 | Morioka et al. | |
| 6,078,953 A | 6/2000 | Vaid et al. | |
| 6,094,531 A | 7/2000 | Allison et al. | |
| 6,108,697 A | 8/2000 | Raymond | |
| 6,192,472 B1 | 2/2001 | Garay et al. | |
| 6,243,091 B1 | 6/2001 | Berstis | |
| 6,292,810 B1 | 9/2001 | Richards | |
| 6,356,885 B2 | 3/2002 | Ross et al. | |
| 6,408,294 B1 | 6/2002 | Getchius et al. | |
| 6,493,761 B1 | 12/2002 | Baker et al. | |
| 6,499,105 B1 | 12/2002 | Yoshiura et al. | |
| 6,515,681 B1 | 2/2003 | Knight | |
| 6,523,026 B1 | 2/2003 | Gillis | |
| 6,539,024 B1 | 3/2003 | Janoska et al. | |
| 6,571,275 B1 | 5/2003 | Dong et al. | |
| 6,598,033 B2 | 7/2003 | Ross et al. | |
| 6,662,176 B2 | 12/2003 | Brunet et al. | |

(Continued)

OTHER PUBLICATIONS

Chapter 1. Introduction, "Computer program product for analyzing network traffic," Ethereal. http://web.archive.org/web/20030315045117/www.ethereal.com/distribution/docs/user-guide, pp. 17-26.

(Continued)

*Primary Examiner*—Isaac M. Woo
(74) *Attorney, Agent, or Firm*—Patent Capital Group

(57) ABSTRACT

A document accessible over a network can be registered. A registered document, and the content contained therein, is not transmitted undetected over and off of the network. In one embodiment, the invention includes a manager agent to maintain signatures of registered documents and a match agent to detect the unauthorized transmission of the content of registered documents.

16 Claims, 21 Drawing Sheets

U.S. PATENT DOCUMENTS

| | | |
|---|---|---|
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 2001/0037324 A1 | 11/2001 | Agrawal et al. |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0181513 A1 | 9/2004 | Henderson et al. |
| 2004/0194141 A1* | 9/2004 | Sanders ............... 725/53 |
| 2004/0196970 A1 | 10/2004 | Cole |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0091443 A1 | 4/2005 | Hershkovich et al. |
| 2005/0091532 A1 | 4/2005 | Moghe |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1* | 2/2006 | Forman et al. ............... 707/10 |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 | 4/2006 | Baba et al. |
| 2006/0167896 A1 | 7/2006 | Kapur et al. |
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |

| | | |
|---|---|---|
| 2007/0248029 A1 | 10/2007 | Merkey et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |

OTHER PUBLICATIONS

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the $3^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Out look, copyright 1995-2000, 2 pages.

* cited by examiner

FIG. 2

QUERY GENERATION FOR A CAPTURE SYSTEM

FIELD OF THE INVENTION

The present invention relates to computer networks, and in particular, to registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices.

FIG. 1 illustrates a simple prior art configuration of a local area network (LAN) 100 connected to the Internet 102. Connected to the LAN 100 are various components, such as servers 104, clients 106, and switch 108. Numerous other networking components and computing devices are connectable to the LAN 100. The LAN 100 may be implemented using various wireline or wireless technologies, such as Ethernet and the 802.11 the IEEE family of wireless communication standards. LAN 100 could be connected to other LANs.

In this prior configuration, the LAN 100 is connected to the Internet 102 via a router 110. This router 110 may be used to implement a firewall. Firewalls are widely used to try to provide users of the LAN 100 with secure access to the Internet 102 as well as to provide separation of a public Web server (for example, one of the servers 104) from an internal network (for example, LAN 100). Data leaving the LAN 100 to the Internet 102 passes through the router 110. The router 110 simply forwards packets as is from the LAN 100 to the Internet 102.

However, once an intruder has gained access to sensitive content inside a LAN such as LAN 100, there presently is no network device that can prevent the electronic transmission of the content from the network to outside the network. Similarly, there is no network device that can analyse the data leaving the network to monitor for policy violations, and make it possible to track down information leaks.

Prior data storage techniques placed files/data in open locations of a disk. The location was not dependent on the time of the storage request. The location could be dependent on the relative importance (important files and/or files likely to be retrieved from the disk frequently are assigned to inner-areas of the disk) and/or what space is open. FIG. 2 illustrates an exemplary prior art disk storing three files (A, B, and C) with each file occupying three blocks of space. These files were stored in the order of A, then B, and finally C. Each of these files contains files A and B contain the same text ("example_1") and file C contains text different than A and B ("example_2"). File A is stored in an inner-area. Files B and C are image files that are not used frequently. File C is stored in an intermediate location of the disk that was open. As illustrated, File B is stored in area farther out than A or B and is not stored in contiguous blocks. If these files were stored based on time, then A would be an innermost-area, followed by B, and then C.

When searching for a particular file or files that were stored in the prior art storage technique the entire disk and/or file system (such as a file allocation table or FAT) was searched to find the desired file or files. FIG. 3 illustrates an exemplary prior art search using lists. As shown, each block (or each line of the file system) is search serially until the desired information is located. When the information is found it is added to a list of positive matches.

If the search was to determine what files have the text "example_1" and "example_2" two different lists (list A and list B) would be created after each serial search is performed. After the two lists are created, the cross product (A×B) is performed and the results are evaluated. This means that the number of evaluations that have to be performed is the number of matches of in A multiplied by the number of matches in B. In other words, when looking for more than one piece of data, the search becomes an order $n^2$ operation.

BRIEF DESCRIPTION OF THE DRAWINGS

The present invention is illustrated by way of example, and not by way of limitation, in the figures of the accompanying drawings in which like reference numerals refer to similar elements and in which:

Figure 2:
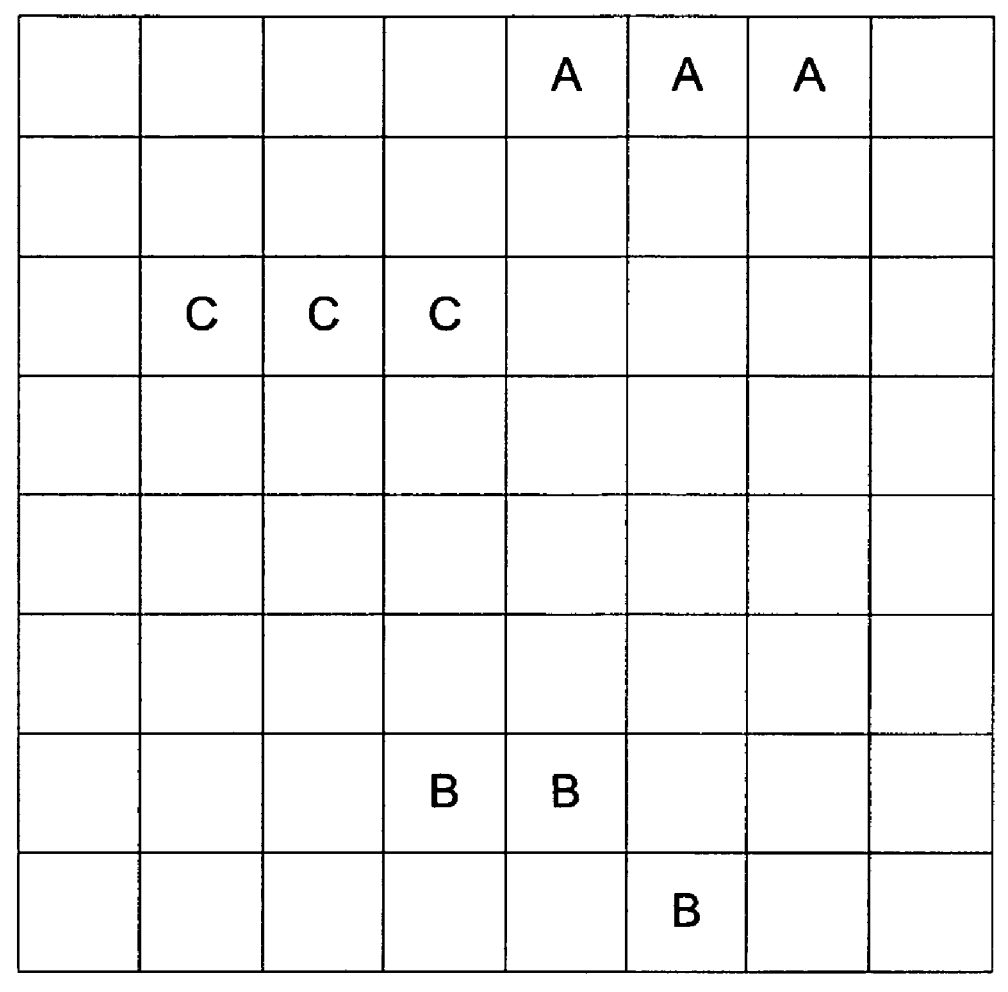

FIG. 2 is a block diagram illustrating one configuration of a capture system according to one embodiment of the present invention;

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Networks

As described earlier, the router 110 of the prior art simply routes packets to and from a network and the Internet. While the router may log that a transaction has occurred (packets have been routed), it does not capture, analyze, or store the content contained in the packets.

Figure 4:
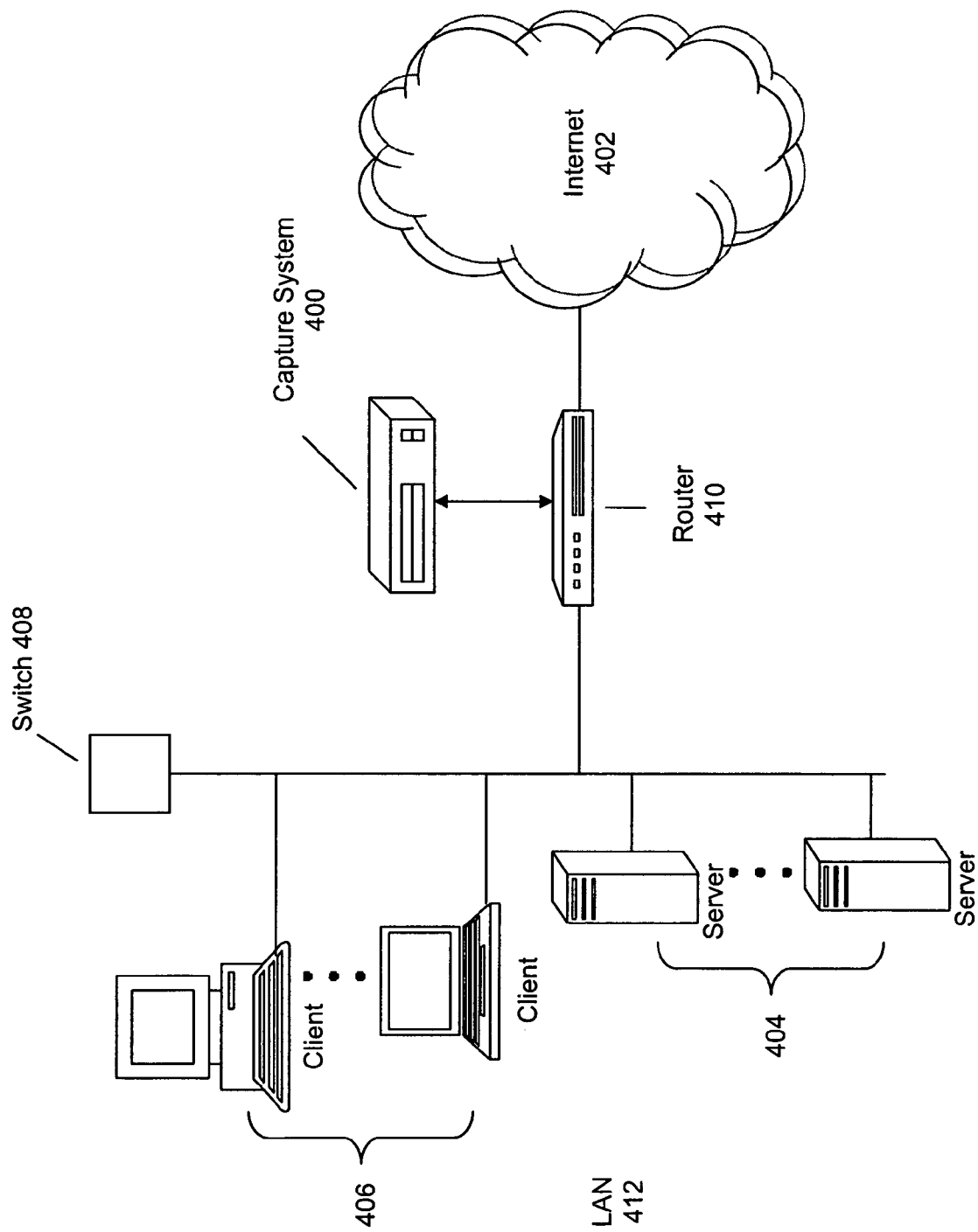
FIG. 4 is a block diagram illustrating an object assembly module according to one embodiment of the present invention.

FIG. 4 illustrates an embodiment of a system utilizing a capture device. In FIG. 4, the router 410 is also connected to a capture system 400 in addition to the Internet 402 and LAN 412. Generally, the router 410 transmits the outgoing data stream to the Internet 402 and a copy of that stream to the capture system 400. The router 410 may also send incoming data to the capture system 400 and LAN 412.

However, other configurations are possible. For example, the capture system 400 may be configured sequentially in front of or behind the router 410. In systems where a router is not used, the capture system 400 is located between the LAN 412 and the Internet 402. In other words, if a router is not used the capture system 400 forwards packets to the Internet. In one embodiment, the capture system 400 has a user interface accessible from a LAN-attached device such as a client 406.

The capture system 400 intercepts data leaving a network such as LAN 412. In an embodiment, the capture system also intercepts data being communicated internal to a network such as LAN 412. The capture system 400 reconstructs the documents leaving the network 100 and stores them in a searchable fashion. The capture system 400 is then usable to search and sort through all documents that have left the network 100. There are many reasons such documents may be of interest, including network security reasons, intellectual property concerns, corporate governance regulations, and other corporate policy concerns. Exemplary documents include, but are not limited to, Microsoft Office documents, text files, images (such as JPEG, BMP, GIF, etc.), Portable Document Format (PDF) files, archive files (such as GZIP, ZIP, TAR, JAR, WAR, RAR, etc.), email messages, email attachments, audio files, video files, source code files, executable files, etc.

Capture System

Figure 5:
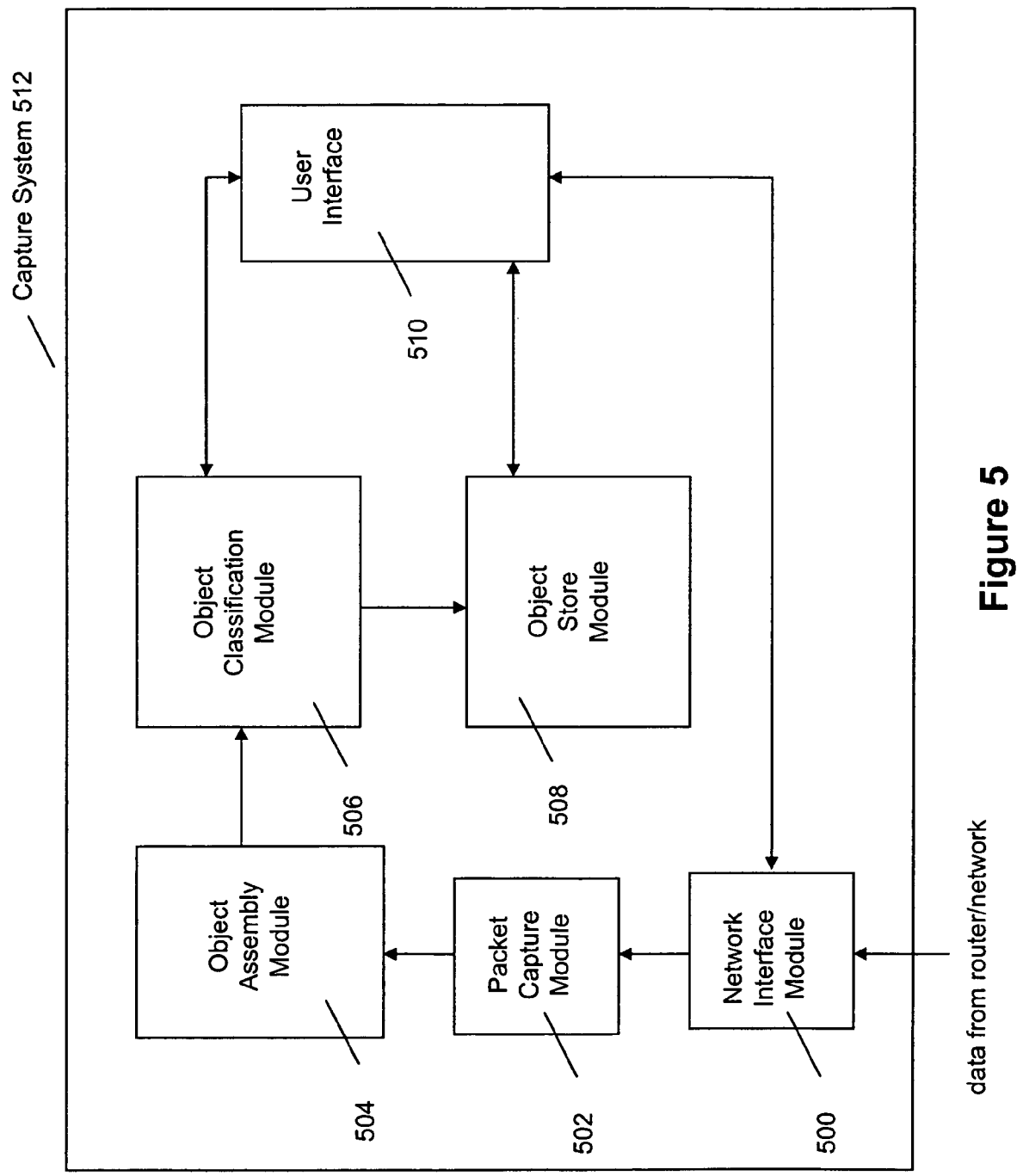
FIG. 5 is a block diagram illustrating an object store module according to one embodiment of the present invention.

FIG. 5 shows an embodiment of a capture system in greater detail. A capture system (such as capture system 400 or 512) may also be referred to as a content analyzer, content or data analysis system, or other similar name. For simplicity, the capture system has been labeled as capture system 500. However, the discussion regarding capture system 500 is equally applicable to capture system 400. A network interface module 500 receives (captures) data from a network or router. Exemplary network interface modules 500 include network interface cards (NICs) (for example, Ethernet cards). More than one NIC may be present in the capture system 512.

Captured data is passed to a packet capture module 502 from the network interface module 500. The packet capture module 502 extracts packets from this data stream. Packet data is extracted from a packet by removing the headers and checksums from the packet. The packet capture module 502 may extract packets from multiple sources to multiple destinations for the data stream. One such case is asymmetric routing where packets from source A to destination B travel along one path but responses from destination B to source A travel along a different path. Each path may be a separate "source" for the packet capture module 502 to obtain packets.

An object assembly module 504 reconstructs the objects being transmitted from the packets extracted by the packet capture module 502. When a document is transmitted, such as in email attachment, it is broken down into packets according to various data transfer protocols such as Transmission Control Protocol/Internet Protocol (TCP/IP), UDP, HTTP, etc. The object assembly module 504 is able to reconstruct the original or reasonably equivalent document from the captured packets. For example, a PDF document would be broken down into packets before being transmitted from a network, these packets are reconfigurable to form the original (or reasonable equivalent) PDF. A complete data stream is obtained by reconstruction of multiple packets. The process by which a packet is created is beyond the scope of this application.

Figure 6:
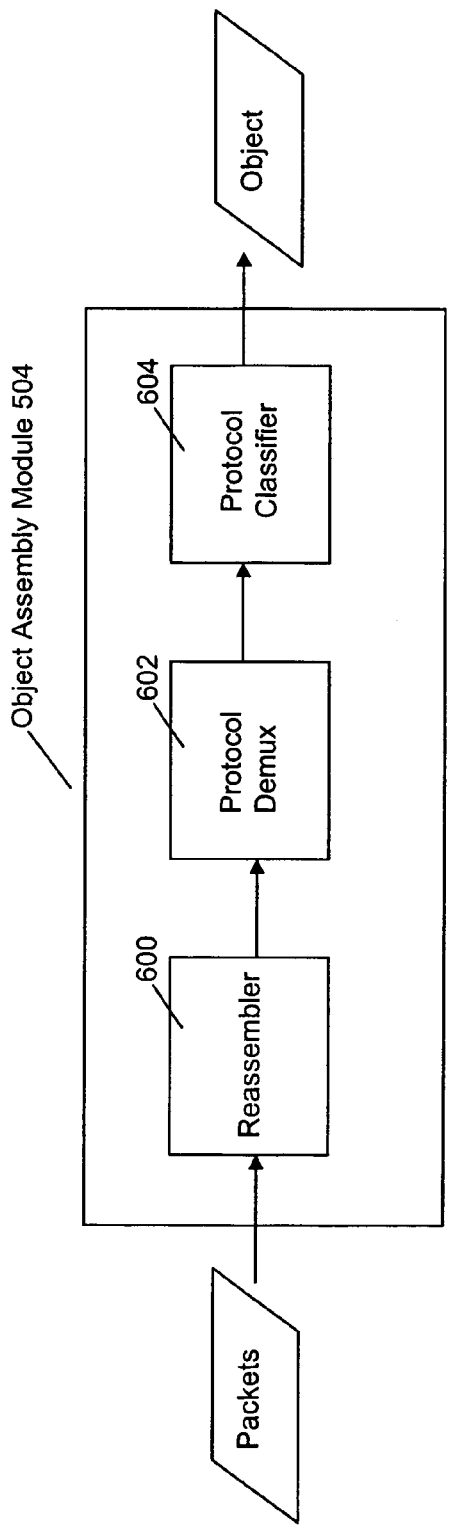
FIG. 6 is a block diagram illustrating a document registration system according to one embodiment of the present invention.

FIG. 6 illustrates an embodiment of an object assembly module. This object assembly module 606 includes a reassembler 600, protocol demultiplexer (demux) 602, and a protocol classifier 604. Packets entering the object assembly module 606 are provided to the reassembler 600. The reassembler 600 groups (assembles) the packets into at least one unique flow. An exemplary flow includes packets with identical source IP and destination IP addresses and/or identical TCP source and destination ports. In other words, the reassembler 600 organizes a packet stream by sender and recipient.

The reassembler 600 begins a new flow upon the observation of a starting packet. This starting packet is normally defined by the data transfer protocol being used. For TCP/IP, the starting packet is generally referred to as the "SYN" packet. The flow terminates upon observing a finishing packet (for example, a "Reset" or "FIN" packet in TCP/IP). If the finishing packet is observed by the reassembler 600 within a pre-determined time constraint, the flow terminates via a timeout mechanism. A TCP flow contains an ordered sequence of packets that may be assembled into a contiguous data stream by the reassembler 600. Thus, a flow is an ordered data stream of a single communication between a source and a destination.

The flow assembled by the reassembler 600 is provided to a protocol demultiplexer (demux) 602. In an embodiment, the protocol demux 602 sorts assembled flows using ports, such as TCP and/or UDP ports, by performing a speculative classification of the flow contents based on the association of well-known port numbers with specified protocols. For example, Web Hyper Text Transfer Protocol (HTTP) packets (such as, Web traffic packets) are typically associated with TCP port 80, File Transfer Protocol (FTP) packets with TCP port 20, Kerberos authentication packets with TCP port 88, etc. Thus, the protocol demux 402 separates the different protocols that exist in a flow.

A protocol classifier 604 may further sort the flows in addition to the sorting done by the protocol demux 602. The protocol classifier 604 (operating either in parallel or in sequence to the protocol demux 602) applies signature filters to a flow to attempt to identify the protocol based solely on the transported data. Furthermore, the protocol classifier 604 may override the classification assigned by the protocol demux 402. The protocol classifier 604 uses a protocol's signature(s) (such as, the characteristic data sequences of a defined protocol) to verify the speculative classification performed by the protocol demux 602. For example, if an individual or program attempted to masquerade an illicit communication (such as file sharing) using an apparently benign port (for example, TCP port 80), the protocol classifier 604 would use the HTTP protocol signature(s) to verify the speculative classification performed by protocol demux 602.

An object assembly module, such as object assembly modules 504 and 606 outputs each flow, organized by protocol, which represent the underlying objects being transmitted. These objects are passed to the object classification module 506 (also referred to as the "content classifier") for classification based on content. A classified flow may still contain multiple content objects depending on the protocol used. For example, a single flow using HTTP may contain over 100 objects of any number of content types. To deconstruct the flow, each object contained in the flow is individually extracted and decoded, if necessary, by the object classification module 506.

The object classification module 506 uses the inherent properties and/or signatures of various documents to determine the content type of each object. For example, a Word document has a signature that is distinct from a PowerPoint document or an email. The object classification module 506 extracts each object and sorts them according to content type. This classification prevents the transfer of a document whose file extension or other property has been altered. For example, a Word document may have its extension changed from .doc to .dock but the properties and/or signatures of that Word document remain the same and detectable by the object classification module 506. In other words, the object classification module 506 does more than simple extension filtering.

The object classification module 506 may also determine whether each object should be stored or discarded. This determination is based on definable capture rules used by the object classification module 506. For example, a capture rule may indicate that all Web traffic is to be discarded. Another capture rule could indicate that all PowerPoint documents should be stored except for ones originating from the CEO's IP address. Such capture rules may be implemented as regular expressions or by other similar means.

The capture rules may be authored by users of a capture system. The capture system may also be made accessible to any network-connected machine through the network interface module 500 and/or user interface 510. In one embodiment, the user interface 510 is a graphical user interface providing the user with friendly access to the various features of the capture system 512. For example, the user interface 510 may provide a capture rule authoring tool that allows any capture rule desired to be written. These rules are then applied by the object classification module 506 when determining whether an object should be stored. The user interface 510 may also provide pre-configured capture rules that the user selects from along with an explanation of the operation of such standard included capture rules. Generally, by default, the capture rule(s) implemented by the object classification module 506 captures all objects leaving the network that the capture system is associated with.

Figure 7:
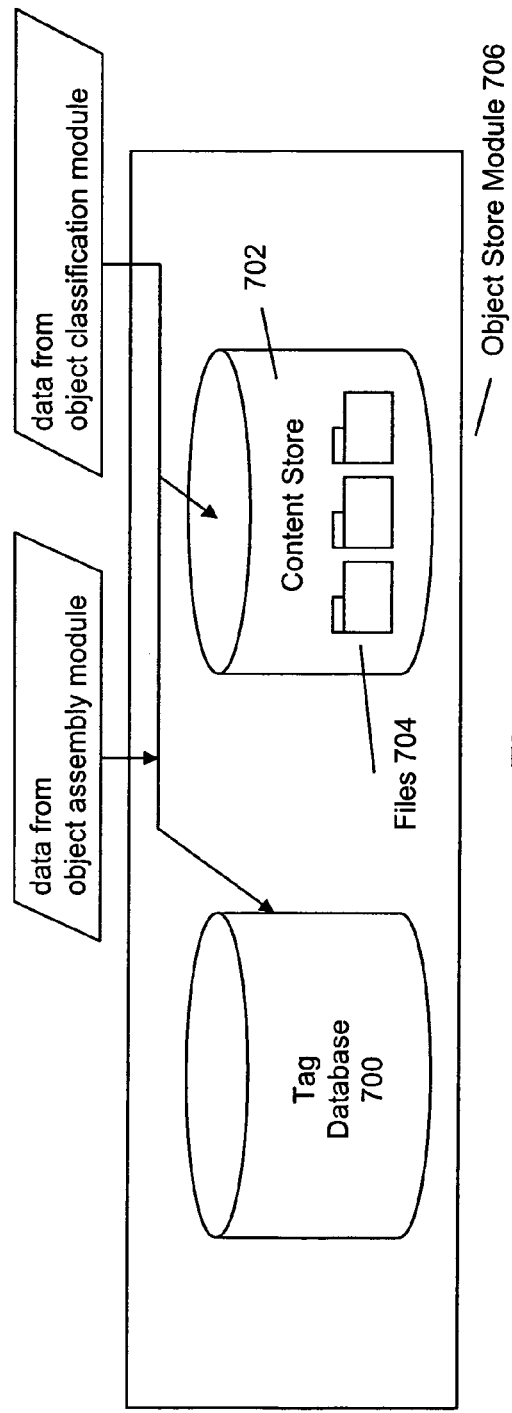
FIG. 7 is a block diagram illustrating registration module according to one embodiment of the present invention.

If the capture of an object is mandated by one or more capture rules, the object classification module 506 may determine where in the object store module 508 the captured object should be stored. FIG. 7 illustrates an embodiment of an object store module. Within the content store 702 are files 704 grouped up by content type. Thus, for example, if an object classification module (such as object classification module 506) determines that an object is a Word document that should be stored, it can store it in the file 704 reserved for Word documents. The object store module 706 may be internal to a capture system or external (entirely or in part) using, for example, some network storage technique such as network attached storage (NAS), and storage area network (SAN), or other database.

In an embodiment, the content store 702 is a canonical storage location that is simply a place to deposit the captured objects. The indexing of the objects stored in the content store 702 is accomplished using a tag database 700. The tag database 700 is a database data structure in which each record is a "tag" that indexes an object in the content store 702 and contains relevant information (metadata) about the stored object. An example of a tag record in the tag database 700 that indexes an object stored in the content store 702 is set forth in Table 1:

TABLE 1

| Field Name | Definition (Relevant Information) |
| --- | --- |
| MAC Address | NIC MAC address |
| Source IP | Source IP Address of object |
| Destination IP | Destination IP Address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |

There are various other possible tag fields and some tag fields listed in Table 1 may not be used. In an embodiment, the tag database 500 is not implemented as a database and another data structure is used.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The mapping of tags to objects may be obtained by using unique combinations of tag fields to construct an object's name. For example, one such possible combination is an ordered list of the source IP, destination IP, source port, destination port, instance and timestamp. Many other such combinations including both shorter and longer names are possible. A tag may contain a pointer to the storage location where the indexed object is stored.

The objects and tags stored in the object store module 508 may be interactively queried by a user via the user interface 510. In one embodiment, the user interface interacts with a web server (not shown) to provide the user with Web-based access to the capture system 312. The objects in the object store module 508 are searchable for specific textual or graphical content using exact matches, patterns, keywords, and/or various other attributes.

For example, the user interface 510 may provide a query-authoring tool (not shown) to enable users to create complex searches of the object store module 308. These search queries are provided to a data mining engine (not shown) that parses the queries the object store module. For example, tag database 700 may be scanned and the associated object retrieved from the content store 702. Objects that matched the specific search criteria in the user-authored query are counted and/or displayed to the user by the user interface 510.

Searches may be scheduled to occur at specific times or at regular intervals. The user interface 510 may provide access to a scheduler (not shown) that periodically executes specific queries. Reports containing the results of these searches are made available to the user at runtime or at a later time such as generating an alarm in the form of an e-mail message, page, system log, and/or other notification format.

Figure 1:
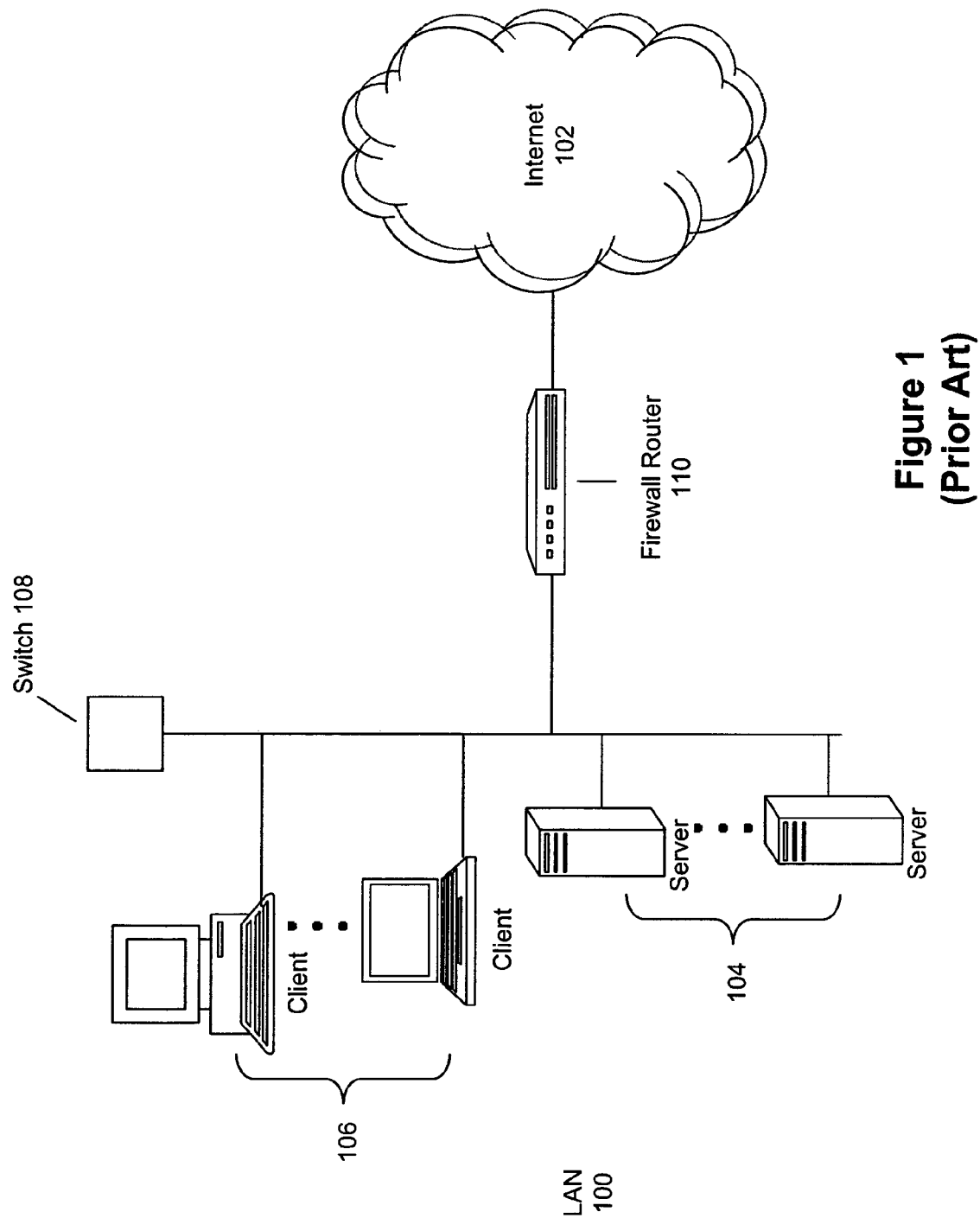
FIG. 1 is a block diagram illustrating a computer network connected to the Internet.
Figure 3:
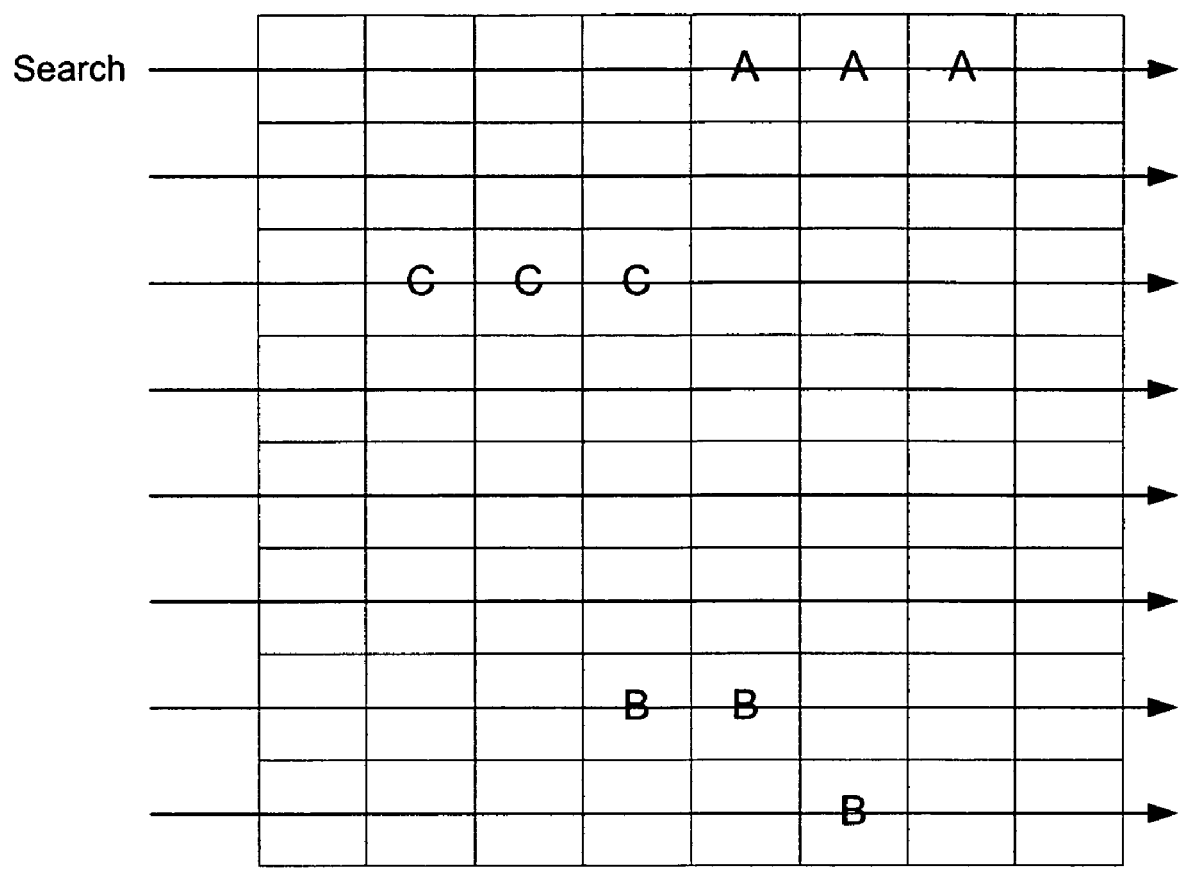
FIG. 3 is a block diagram illustrating the capture system according to one embodiment of the present invention.

Generally, a capture system has been described above as a stand-alone device. However, capture systems may be implemented on any appliance capable of capturing and analyzing data from a network. For example, the capture system 510 described above could be implemented on one or more of the servers or clients shown in FIG. 1. Additionally, a capture system may interface with a network in any number of ways including wirelessly.

Document Registration

The capture system described above implements a document registration scheme. A user registers a document with a capture system, the system then alerts the user if all or part of the content in the registered document is attempting to, or leaving, the network. Thus, un-authorized documents of various formats (e.g., Microsoft Word, Excel, PowerPoint, source code of any kind, text are prevented) are prevented from leaving an enterprise. There are great benefits to any enterprise that keeps its intellectual property, and other critical, confidential, or otherwise private and proprietary content from being mishandled. Sensitive documents are typically registered with the capture system 200, although registration may be implemented using a separate device.

Figure 8:
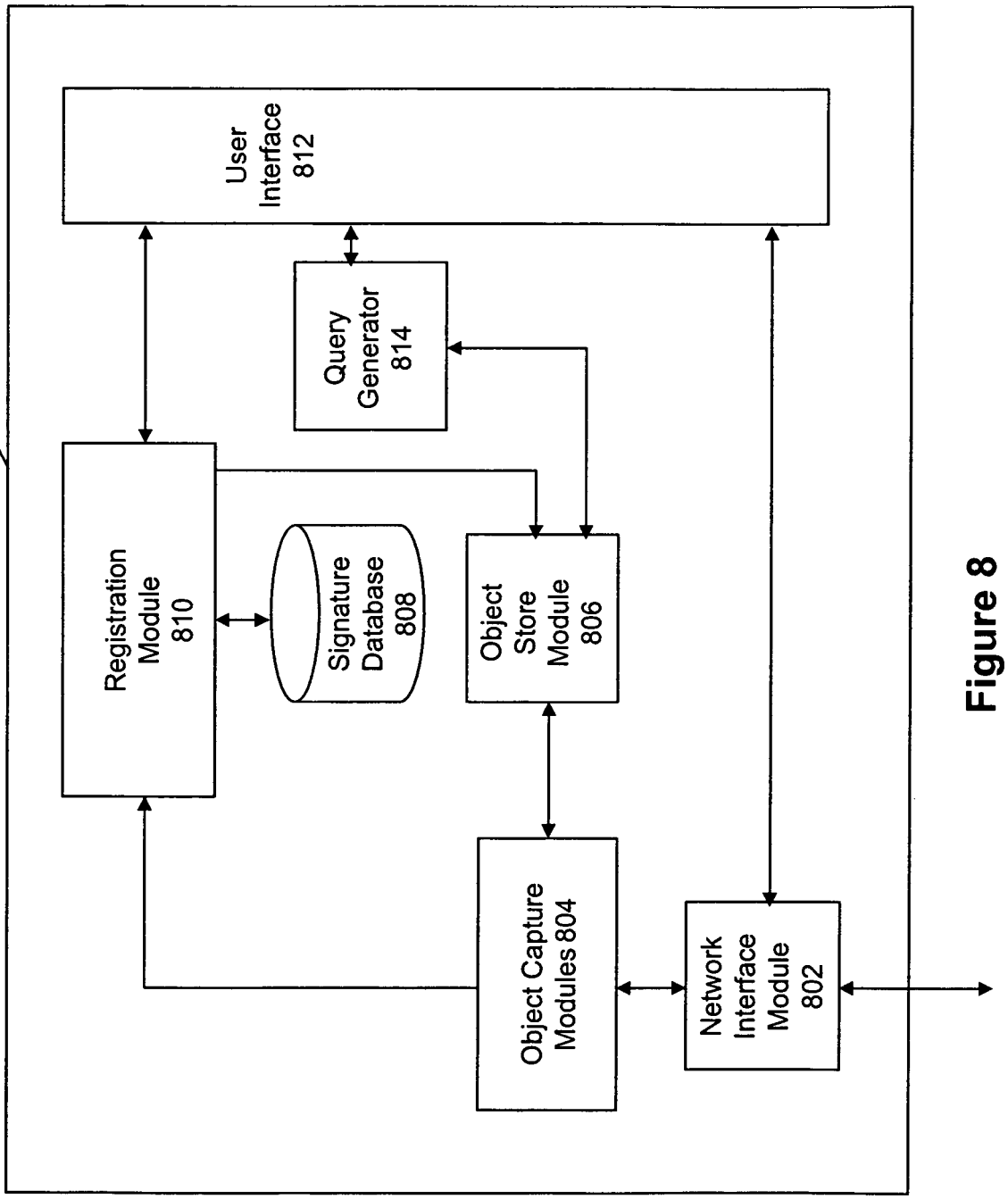
FIG. 8 illustrates an embodiment of the flow of the operation of a registration module.

FIG. 8 illustrates an embodiment of a capture/registration system. The capture/registration system 800 has components which are used in a similar number similar or identical to the capture system 500 shown in FIG. 5, including the network interface module 602, the object store module 806, user interface 812, and object capture modules 804 (the packet capture 502, object assembly 504, and object classification 506 modules of FIG. 5).

The capture/registration system 800 includes a registration module 810 interacting with a signature storage 808 (such as a database) to help facilitate a registration scheme. There are numerous ways to register documents. For example, a document may be electronically mailed (e-mailed), uploaded to the registration system 800 (for example through the network interface module 1002 or through removable media), the registration system 800 scanning a file server (registration server) for documents to be registered, etc. The registration process may be integrated with an enterprise's document management systems. Document registration may also be automated and transparent based on registration rules, such as "register all documents," "register all documents by specific author or IP address," etc.

After being received, classified, etc., a document to be registered is passed to the registration module 810. The registration module 810 calculates a signature or a set of signatures of the document. A signature associated with a document may be calculated in various ways. An exemplary signature consists of hashes over various portions of the document, such as selected or all pages, paragraphs, tables and sentences. Other possible signatures include, but are not limited to, hashes over embedded content, indices, headers, footers, formatting information, or font utilization. A signature may also include computations and meta-data other than hashes, such as word Relative Frequency Methods (RFM)—Statistical, Karp-Rabin Greedy-String-Tiling-Transposition, vector space models, diagrammatic structure analysis, etc.

The signature or set of signatures associated on a document is stored in the signature storage 808. The signature storage 808 may be implemented as a database or other appropriate data structure as described earlier. In an embodiment, the signature storage 808 is external to the capture system 800.

Registered documents are stored as objects in the object store module 806 according to the rules set for the system. In an embodiment, only documents are stored in the content store 806 of the object system network. These documents have no associated tag since many tag fields do not apply to registered documents.

As set forth above, the object capture modules 802 extract objects leaving the network and store various objects based on capture rules. In an embodiment, all extracted objects (whether subject to a capture rule or not) are also passed to the registration module for a determination whether each object is, or includes part of, a registered document.

The registration module 810 calculates the set of one or more signatures of an object received from the object capture modules 804 in the same manner as the calculation of the set of one or more signatures of a document received from the user interface 812 to be registered. This set of signatures is then compared against all signatures in the signature database 808. However, parts of the signature database may be excluded from a search to decrease the amount comparisons to be performed.

A possible unauthorized transmission is detectable if any one or more signatures in the set of signatures of an extracted object matches one or more signatures in the signature database 808 associated with a registered document. Detection tolerances are usually configurable. For example, the system may be configured so that at least two signatures must match before a document is deemed unauthorized. Additionally, special rules may be implemented that make a transmission authorized (for example, if the source address is authorized to transmit any documents off the network).

A query generator 614 may be used to search the object store module 806 for specific documents, emails, etc.

Figure 9:
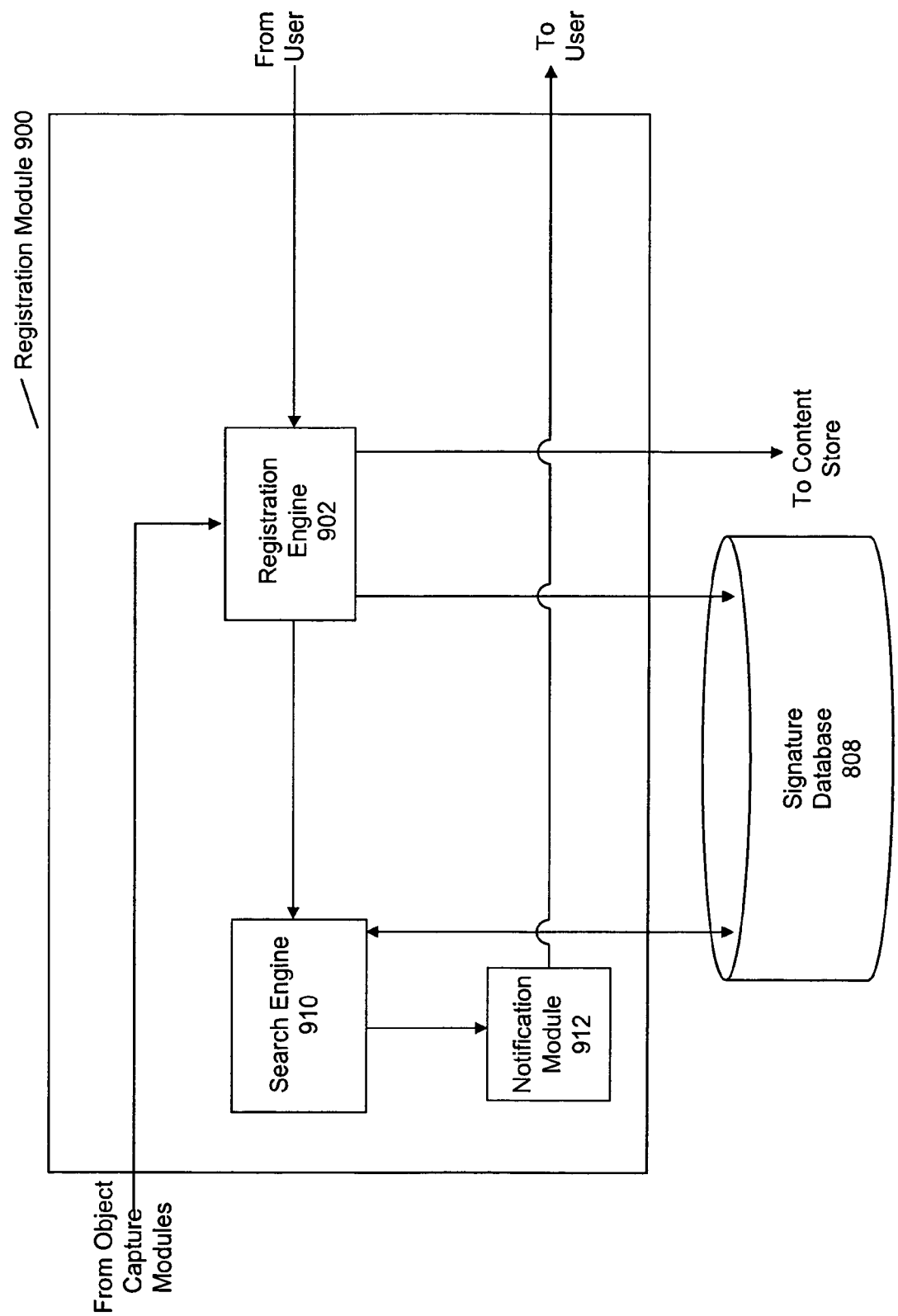
FIG. 9 is a flow diagram illustrating an embodiment of a flow to generate signatures.

An embodiment of a registration module is illustrated in FIG. 9. As discussed above, a user may select a document to be registered. The registration engine 902 generates signatures for the document and forwards the document to content storage and the generated signatures to the signature database 808. Generated signatures are associated with a document, for example, by including a pointer to the document or to some attribute to identify the document.

The registration engine calculates signatures for a captured object and forwards them to the search engine 910. The search engine 910 queries the signature database 808 to compare the signatures of a captured object to the document signatures stored in the signature database 808. Assuming for the purposes of illustration, that the captured object is a Word document that contains a pasted paragraph from registered PowerPoint document, at least one signature of registered PowerPoint signatures will match a signature of the captured Word document. This type of event is referred to as the detection of an unauthorized transfer, a registered content transfer, or other similarly descriptive term.

When a registered content transfer is detected, the transmission may be halted or allowed with or without warning to the sender. In the event of a detected registered content transfer, the search engine 910 may activate the notification module 912, which sends an alert to the registered document owner. The notification module 912 may send different alerts (including different user options) based on the user preference associated with the registration and the capabilities of the registration system.

An alert indicates that an attempt (successful or unsuccessful) to transfer a registered content off the network has been made. Additionally, an alert may provide information regarding the transfer, such as source IP, destination IP, any other information contained in the tag of the captured object, or some other derived information, such as the name of the person who transferred the document off the network. Alerts are provided to one or more users via e-mail, instant message (IM), page, etc. based on the registration parameters. For example, if the registration parameters dictate that an alert is only to be sent to the entity or user who requested registration of a document then no other entity or user will receive an alert.

If the delivery of a captured object is halted (the transfer is not completed), the user who registered the document may need to provide consent to allow the transfer to complete. Accordingly, an alert may contain some or all of the information described above and additionally contain a selection mechanism, such as one or two buttons—to allow the user to indicate whether the transfer of the captured object is eligible for completing. If the user elects to allow the transfer, (for example, because he is aware that someone is emailing a part of a registered document (such as a boss asking his secretary to send an email), the transfer is executed and the captured object is allowed to leave the network.

If the user disallows the transfer, the captured object is not allowed off of the network and delivery is permanently halted. Several halting techniques may be used such as having the registration system proxy the connection between the network and the outside, using a black hole technique (discarding the packets without notice if the transfer is disallowed), a poison technique (inserting additional packets onto the network to cause the sender's connection to fail), etc.

Attributes

When a search of object captured by a capture system is performed, it is desirable to make the search as fast as possible. A technique to speed up searches is to perform searches over the tag database instead of the content store, since the content store will generally be stored on disk and is therefore far more costly both in terms of time and processing power.

A query is generally in the form of a regular expression. A regular expression is a string that describes or matches a set of string according to certain syntax rules. There are various well-known syntax rules such as POSIX standard regular expressions and PERL scripting language regular expressions and are used by many text editors and utilities to search and manipulate bodies of text based on certain patterns and are well-known in the art. For example, according to one syntax (Unix), the regular expression 4\d{15} means the digit "4" followed by any fifteen digits in a row. This user query would return all objects containing that match this pattern.

Certain useful search categories are not well defined by a single regular expression. For example, a query of all emails containing a credit card number is hard to define with a single regular expression as various. Credit card companies use different numbering patterns and conventions. However, a card number for each company is representable by the regular expression and the generic concept of "credit card number" is representable by the union of all such regular expressions.

An attribute, represents a group of one or more regular expressions (or other such patterns). The term "attribute" is merely descriptive, and could just as easily be termed "category," "regular expression list," or any other descriptive term.

Attribute tagging is performed in the object classification 506 module described above. However, attribute tagging may be implemented in other parts of the capture system 512 or as a separate module.

Figure 10:
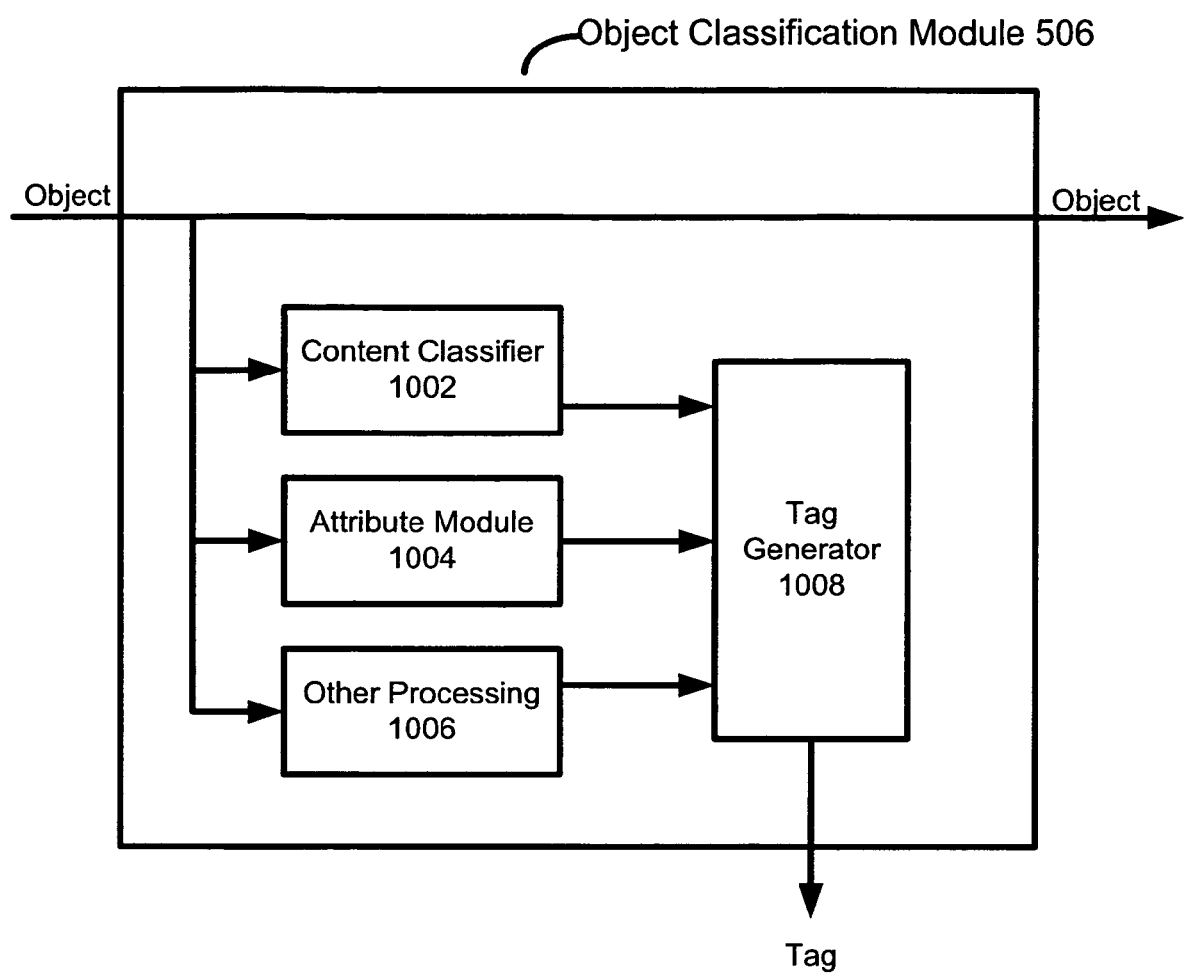
FIG. 10 is a flow diagram illustrating an embodiment of changing tokens into document signatures.

An embodiment of the object classification module is illustrated in FIG. 10. Objects arriving from the object assembly module 504 are forwarded to the content store 702 and are used to generate tags to be associated with the objects. The content classifier 1002 determines the content type of the object. The content type is then forwarded to the tag generator 1008 where it is inserted into the content field described above. Various other tasks, such as protocol and size determination, are represented by the other processing block 1006.

The attribute module 1004 generates an attribute index that is insertable into an index field of the tag by the tag generator 1008.

Figure 11:
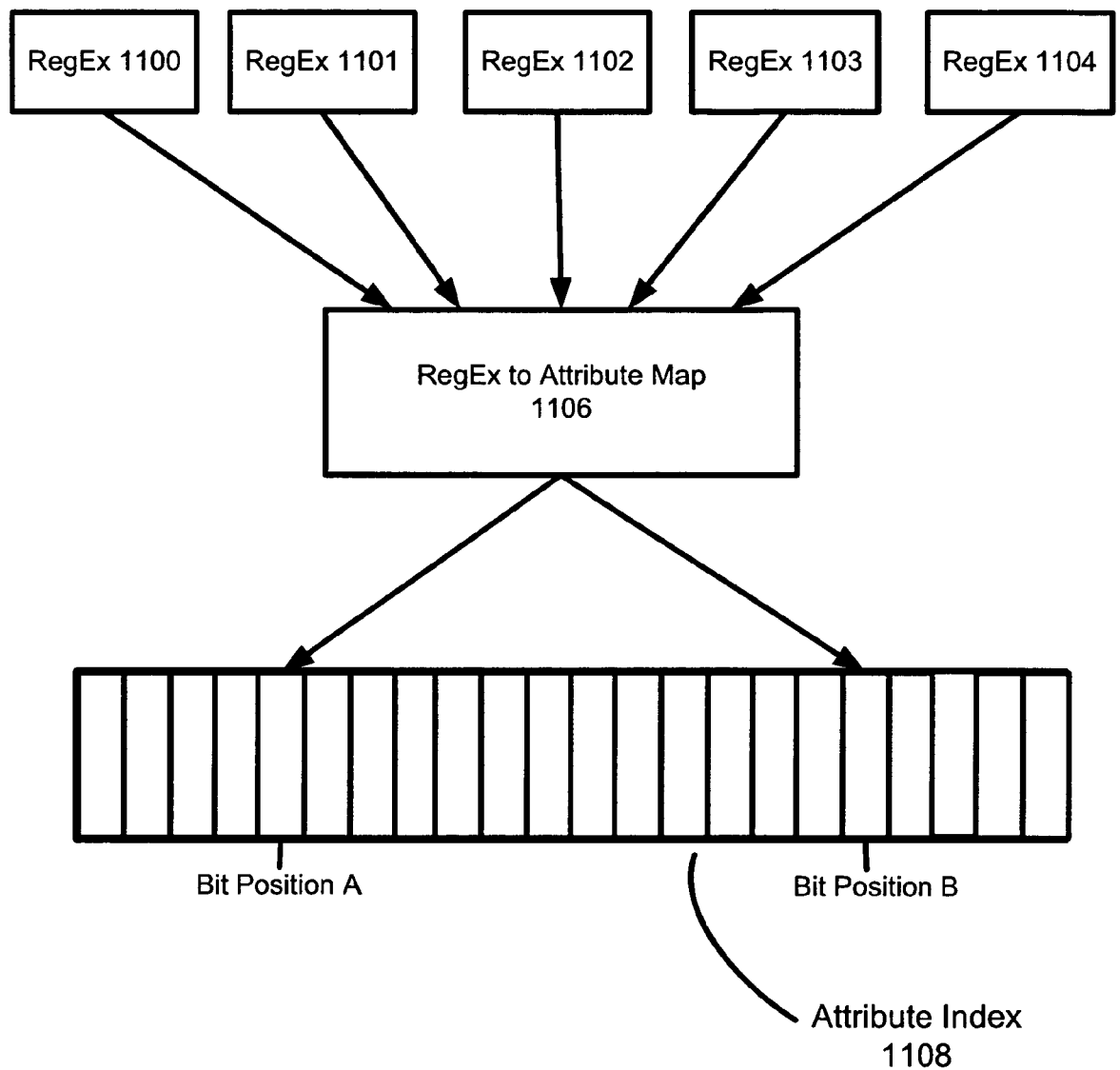
FIG. 11 illustrates an embodiment of a registration engine that generates signatures for documents.

FIG. 11 illustrates an exemplary attribute index. A plurality of regular expressions (labeled RegEx 1100-1104) are mapped to attributes using the attribute map 1106. For example, if regular expressions RegEx 1100-1102 can represent credit card patterns, then these regular expressions would map to a credit card number attribute. Regular expressions 1103 and 1104 may represent phone number patterns and would map to a phone number attribute. A mapping of a regular expression to an attribute is thus the reservation and usage of that attribute as implying a successful matching of the regular expression.

Attribute index 1106 is used to represent the attributes in a compact form. The attribute index 1108 may be implemented as a bit vector with a vector of bits having one bit position associated with each defined attribute. In one embodiment, the attribute index 1108 is 128 bits and 128 separate attributes are definable with this index and occur independently of one another.

The association of attributes to bit positions may be maintained in a table. For example, such a table may associate bit position A with the credit card number attribute and bit position B with the phone number attribute. Since, in this example, regular expressions 1100-1102 map to the credit card attribute, observing any one of the patterns defined by RegEx 1100-1102 causes an a captured object bit position A to be set to show the presence of a credit card number in the captured object.

Setting a bit position is done by changing a bit either from "0" to "1" or from "1" to "0" depending on which value is the default. In one embodiment, bit positions are initialized as "0" and are set to "1" to show the presence of an attribute. Similarly, since regular expressions 1103 and 1104 map to the phone number attribute, observing any one of the patterns defined by RegEx 1103 or 1104 causes bit position B to be set to show the presence of a phone number in the captured object.

Figure 12:
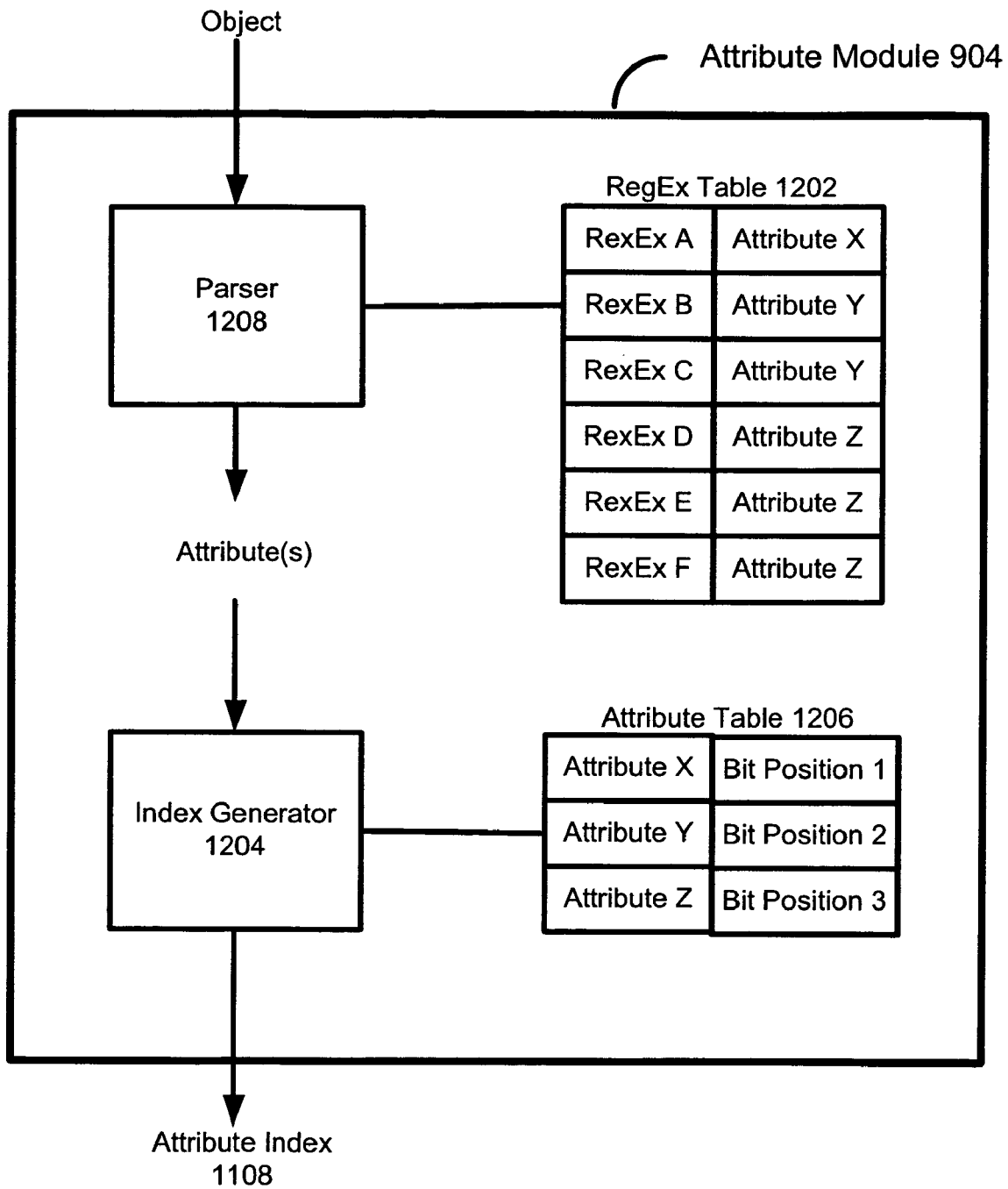
FIG. 12 illustrates an exemplary embodiment of a system for the detection of registered content is performed on a distributed basis.

An embodiment of the attribute module is illustrated in FIG. 12. The input of the attribute module 1004, as set forth above, is an object captured by the object capture and assembly modules. The object may be a word document, email, spreadsheet, or some other document that includes text or other characters that represent a pattern expressed as a regular expression.

The text content contained in the object may be extracted to simplify the attribute tagging processing. The text content of objects includes only textual characters without formatting or application context. The object or text extracted from an object is provided to parser 1200. The parser 1200 parses the object to identify which regular expressions appear in the object.

The parser 1200 accesses a regular expression table 1202 that lists all the regular expressions of interest. The parser 1200 then determines which of the regular expressions appear in the object or the text extracted from the object.

The regular expression table 1202 also associates each regular expression contained therein with an attribute. In this manner, the regular expression table 1202 can function as the regular expression to attribute map 1106 of FIG. 11. For example, the regular expression table 1202 as shown in FIG. 12 maps regular expression A to attribute X; regular expressions B and C to attribute Y; and regular expressions D, E, and F to attribute Z.

Since the regular expression table 1202 contain the regular expressions and their attribute mapping, the parser 1200, by parsing the regular expressions over the object determines which attributes are present in an object. In one embodiment, the parsing is done faster by parsing only the regular expressions related to attributes that have not yet been found in the object. For example, if the parser finds a hit from regular expression D in the object, then attribute Z is found in the object. This makes parsing using regular expressions E and F unnecessary, since attribute Z is already hit.

The parser 1200 outputs a list of attributes found in an object. As explained above, an attribute is a category of patterns such as credit card number, phone numbers, email addresses, bank routing numbers, social security numbers, confidentiality markers, web sites, the names of executive officers of a company, medical conditions or diagnoses, confidential project names or numerical strings indicating salary or compensation information.

Attributes found in the object are provided to an index generator 1204. The index generator 1204 generates the attribute index 1108 described with reference to FIG. 11. The index generator 1204 accesses an attribute table 1206 which contains a mapping of attributes to bit positions of the attribute index 1108. For example, in FIG. 12, attribute X is mapped to bit position 1, attribute Y is mapped to bit position 2, and attribute Z is mapped to bit position 3.

If an object contained regular expression A, D, and F, then the parser 1200 would first note that attribute X has been hit. When recognizing regular expression D, the parser 1200 would note that attribute Z has been hit. Since these are the only attributes in this abbreviated example, the parser 1200 would provide attributes X and Z to the index generator 1204. According to the attribute table 1206, the index generator would set bit positions 1 and 3 of an attribute index 1108. Thus, for this simplified example, the attribute index 1108 would be "101" first bit positions 1 through 3.

The generation of an attribute index 1108 and the use of the specific mapping tables shown in FIG. 12 is just one example of an attribute module 1004 performing attribute tagging. In another embodiment, each possible attribute has a separate field in the tag associated with the object indicating whether the attribute is present in the object. Thus, an attribute index may be thought of as a summary of a plurality of attribute fields. Alternatively, each bit position of the attribute index may be thought of as a separate field. Various other implementations and visualizations are also possible.

Figure 13:
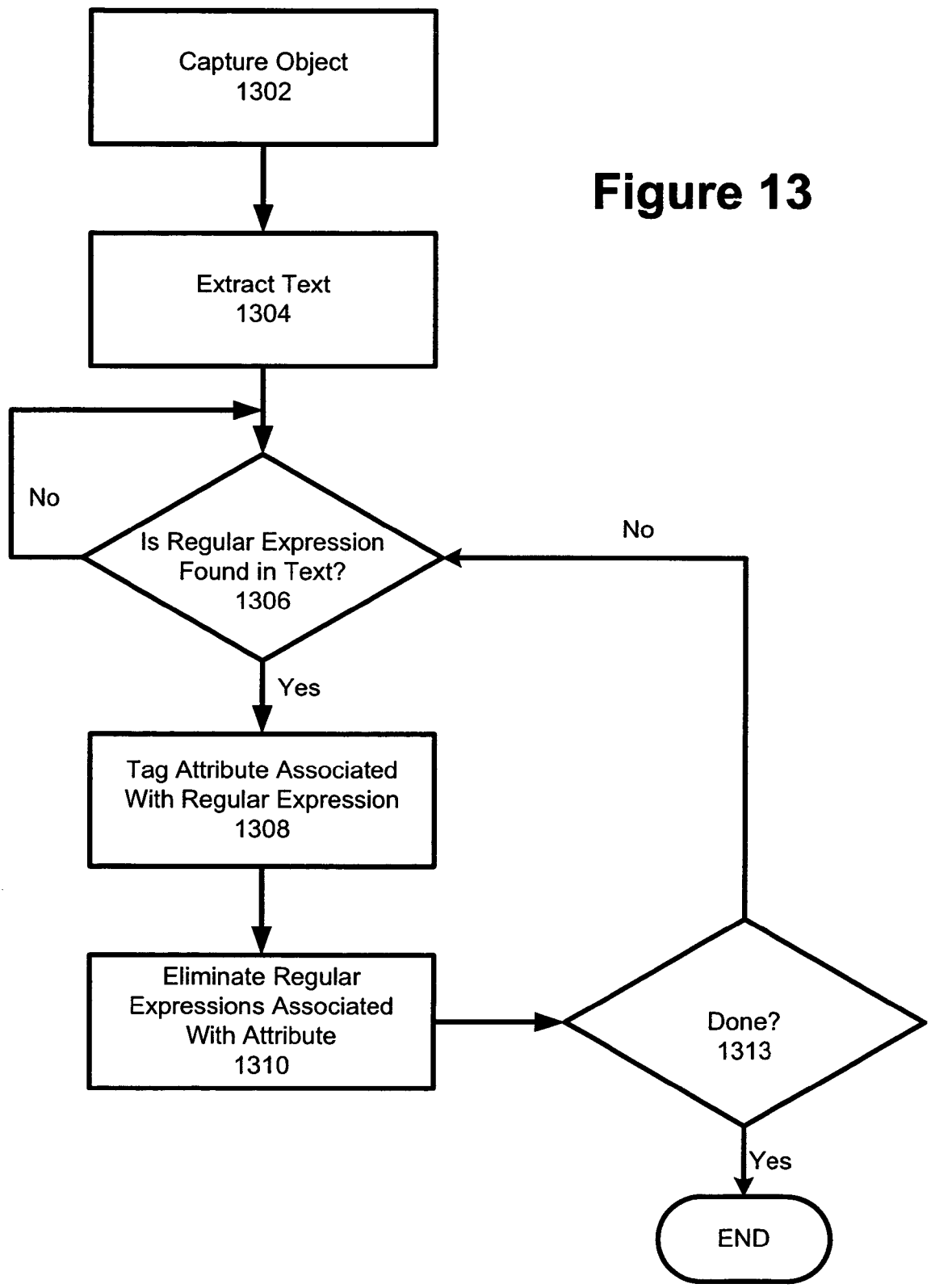
FIG. 13 shows an embodiment of a computing system (e.g., a computer)

An embodiment of a method for attribute tagging is described by FIG. 13. In block 1302, an object is captured. In block 1304, the textual content is extracted from the object. In block 1306, a determination is made as to whether a regular expression appears in the extracted text.

If the regular expression under consideration does not appear in the text, then, processing continues again at block 1306 using the next regular expression on the regular expression list. If, however, the regular expression under consideration does appear in the text, then, in block 1308 the attribute associated with the regular expression is tagged. This may be done by setting a field or position in an index in a tag of metadata associated with the object.

In block 1310, all other regular expressions associated with the observed attribute are removed from future consideration with respect to the object. In block 1312, a determination is made as to whether attribute tagging has completed with respect to the object. If no regular expressions remain to be compared with the extracted text, then the attribute tagging is complete and processing terminates. Otherwise, processing continues at block 1306 with the next regular expression on the list evaluated.

Figure 14:
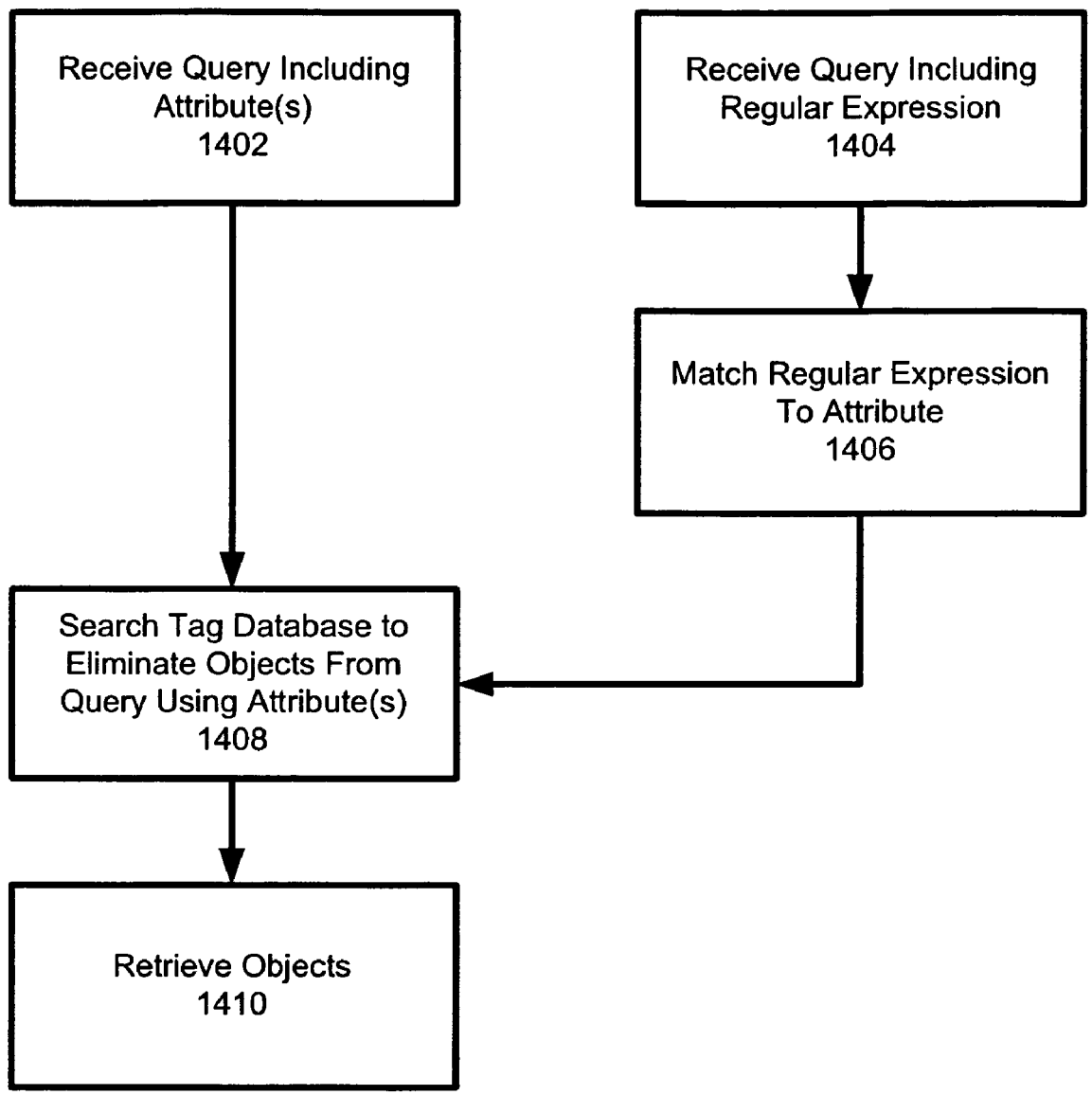
FIG. 14 illustrates an exemplary flow of querying captured objects.

FIG. 14 illustrates an exemplary flow of querying captured objects. In block 1402, a query is issued. The query may be received by a capture device via a user interface. The process described with reference to FIG. 13 may be implemented entirely within the user interface, within some query module of the user interface, or a separate query module.

The query—in addition to other limitations, such as content type, size, time range, and so on—may contain one or more attributes the query is looking for. For example, the query could be for all Microsoft Excel documents from last week containing credit card numbers (credit card numbers being an attribute).

The received query may only include one or more regular expressions, as shown in block 1404. In block 1406, the regular expression is matched to an attribute, if possible. For example, if the regular expression in the query is only satisfied if another regular expression associated with an attribute is satisfied, then, objects having this attribute tagged are more relevant for this query than objects in general. In particular, any object satisfying the regular expression would also satisfy the attribute. For example, a query for a specific credit card number or range will satisfy the credit card attribute.

Whether provided by the user, or identified based on the query, in block 1408, the appropriate attribute or attributes are used to eliminate objects from the query. In one embodiment, a search is done over the appropriate attribute field or index bit positions in the tags in the tag database. If the attributes being sought are not shown as present in an object, the object is eliminated from further consideration for this query.

In block 1410, the objects remaining after elimination at 1408 are retrieved from the medium they are stored on (such as a disk) into memory. They can now be presented to the user as query results, or object can be further eliminated by parsing the retrieved objects for the specific regular expression queried for, where no specific attribute was named. Alternatively, only a link to the objects remaining after elimination are retrieved.

In one embodiment, the attributes are completely user-configurable. A user interface provides an attribute editor that allows a user to define attributes by creating an attribute and associating a group of one or more regular expressions with the created attribute. The capture device may come pre-configured with a list of common or popular attributes that may be tailored specifically to the industry into which the capture device is sold.

In one embodiment, a capture device may create new attributes automatically. For example, a capture device may observe that a certain regular expression is being searched with some threshold frequency (generally set to be above normal). The capture device creates an attribute to be associated with this regular expression and begins tagging the newly defined attribute when capturing new objects. In another embodiment, a capture device may suggest that a new attribute be created when a regular expression is searched frequently. In yet another embodiment, a capture device may suggest that an attribute be deleted if infrequently used to make room for another more useful attribute.

Query Generation

Figure 15:
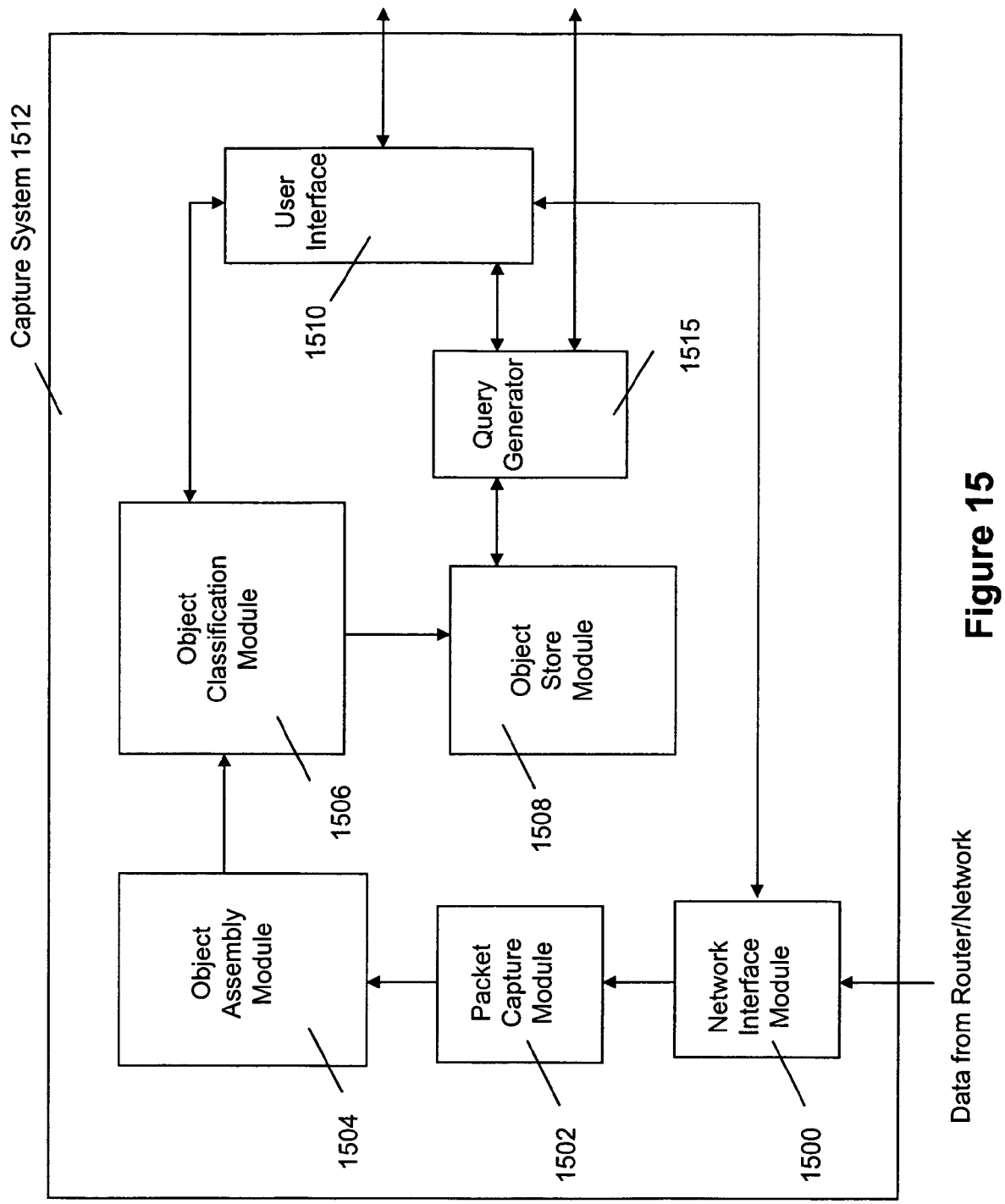
FIG. 15 illustrates an exemplary embodiment of a capture system for querying captured data.

Objects and/or their associated metadata should be searchable upon request. For example, emails, documents, images, etc. may be processed by a capture system and searched. FIG. 15 illustrates an exemplary embodiment of a capture system for querying captured data. The network interface module 500, packet capture module 502, object assembly module 504, object classification module 506, object store module 508, and user interface 510 have all been described before.

The capture system 1512 also includes a query generator module 1514. The query generator module 1514 changes a search string into a capture system 1512 usable form. A search string comes from the user interface 1510 or an outside source, such as another capture system or remote request. The user interface 1510 may be outside of the capture system 1512. The query generator module 1514 may also be used with a capture/registration system (such as the one illustrated in FIG. 8).

As described earlier, objects and tags are generally stored in the object store module 508 even though objects and/or tags may also be persisted to remote databases. These objects and tags are searchable for specific content using exact matches, patterns, keywords, and/or various other attributes generated by the query generator 1514. For example, the tag database 700 may be scanned and the associated object retrieved from the content store 702. Additionally, the query generator 1514 may also search "look-asides" such as dictionaries and compiled lists. Look-asides may be stored in volatile storage (such as RAM) and/or in non-volatile storage (such as a hard disk, flash device, etc.). In practical deployments, a volatile look-aside structure is often shadowed into a non-volatile storage for persistence over a power loss or other fault condition.

Searches may be conducted at specific times or be periodically scheduled. For example, in some business environments it may be beneficial to have an on-demand query about emails leaving the network from a key employee and have a weekly search and report.

The user interface 510 may provide access to a scheduler (not shown) that periodically executes specific queries. Reports containing the results of these searches are made available to the user at runtime or at a later time by generating an alarm in the form of an e-mail message, page, system log, and/or other notification format.

Capture (and capture/registration) systems receive, sort, and store many different types of data. In one embodiment, captured objects, their metadata, and/or look-aside information are stored based on the time received. Accordingly, captured objects, metadata, and/or look-aside information is already in an order. Because information is already sorted by time, a search of this information is an order n search which is an improvement over the prior art in which time is not a primary index. Storing captured objects by time may also be accomplished by partitioning into time divisions. Of course, more than one entry may be made per time division. Time divisions may be of any size. For example, the time division may be one hour, two hours, one day, etc.

Figure 16A:
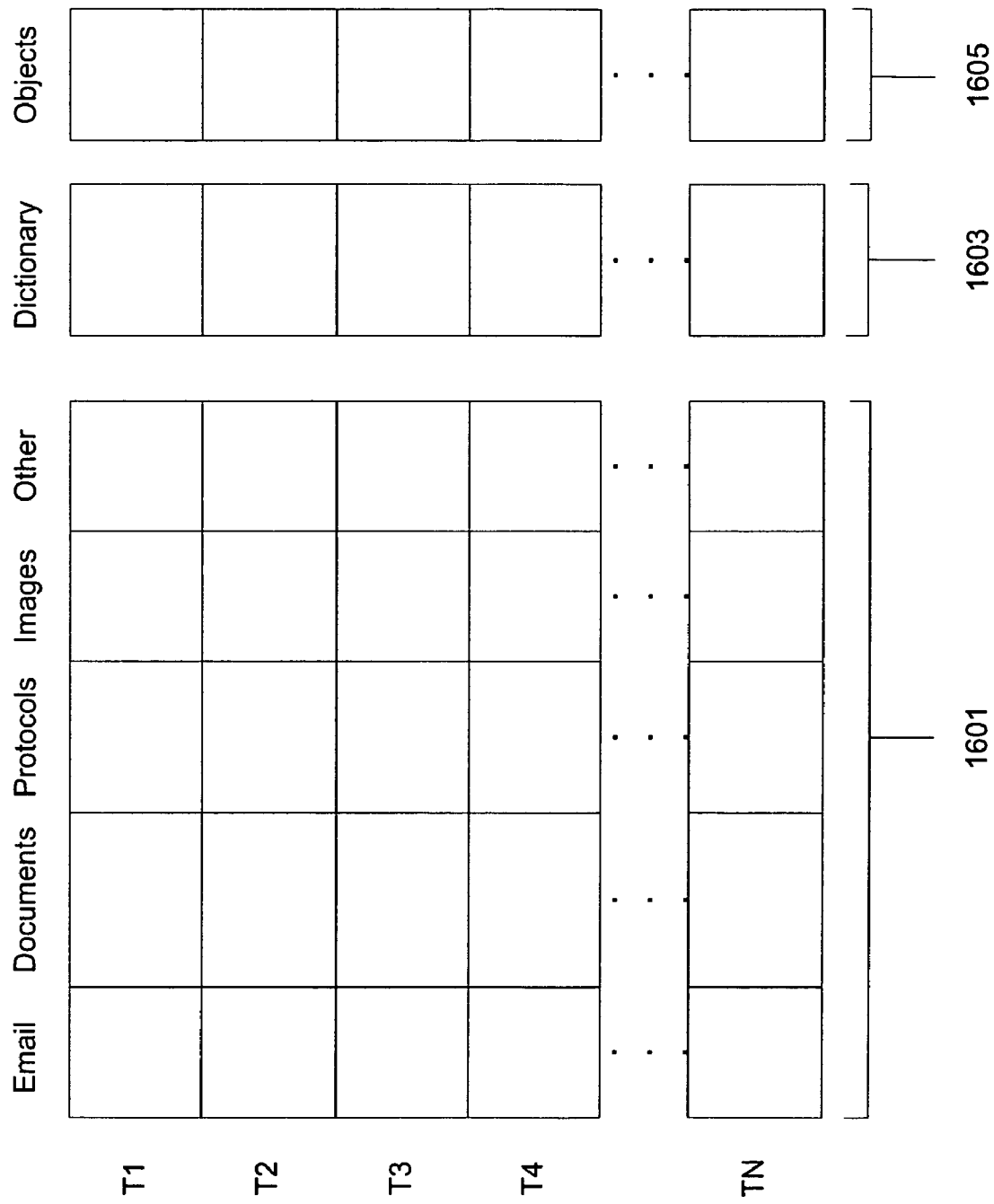
FIGS. 16(a)-(c) illustrate an embodiment of an exemplary storage configuration for data received by a capture system.
Figure 16B:
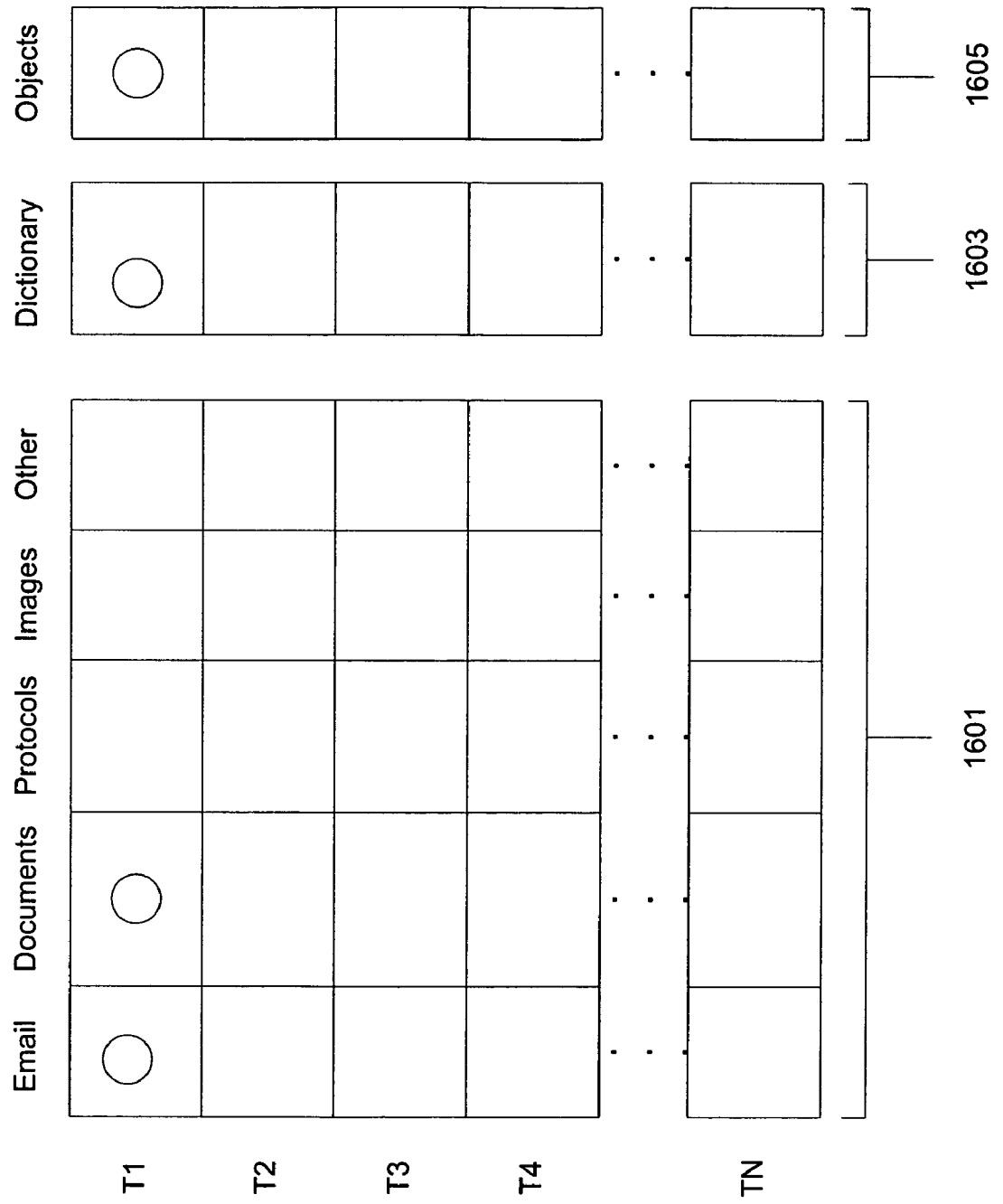
Figure 16C:
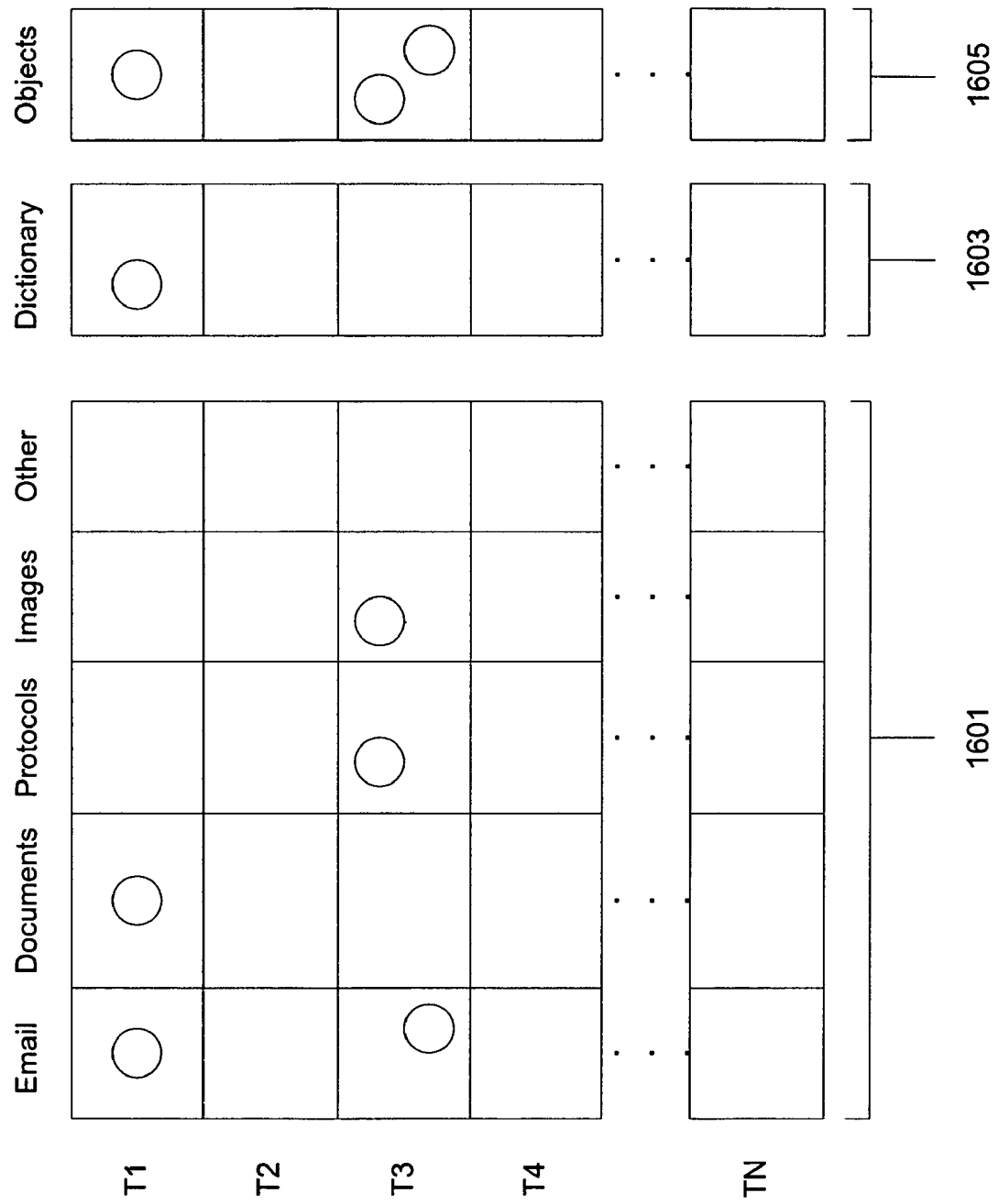

FIGS. 16(a)-(c) illustrate an embodiment of an exemplary storage configuration for data received by a capture system. In this particular example, time divisions (TN) are used.

FIG. 16(a) illustrates the storage configuration prior to any events occurring. Metadata (tag) storage 1601 stores the metadata associated with a captured object. Exemplary metadata has been described previously. Metadata may be separated by categories. Metadata storage 1601 is divided into five categories: email, documents, protocols, images, and other/miscellaneous. However, any number of classifications may be used. A single transaction could fall into more than one classification. For example, an email with an attached word document falls into three categories: email, document, and protocol (the protocol is dependent upon the type of email service used such as SMTP, POP3 or IMAP). Typically, a disk (such as a hard drive) or several disks for redundancy and performance reasons, are used for metadata storage. Tag database 700 is an example of metadata storage.

Look-aside storage 1603 stores information/data known to a capture system from a source other than object capture. For example, look-aside storage 1603 may include such information as the name of the competitor to company A is company B, the names of people in a particular department or office, etc. Volatile storage (such as RAM) or non-volatile storage (such as a disk) may be used for look-aside storage 1603. If volatile storage is used, provisions should be made to backup this information in the look-aside storage 1603 into non-volatile storage in case of a failure (such as a power failure) that would cause the information in the volatile storage to be lost. If time divisions are used, time divisions of look-aside storage 1603 could have different values.

Object storage 1605 stores captured/reassembled objects. For example, object storage 1605 may store text documents, images, videos, etc. The content store 702 is an example of object storage.

FIG. 16(b) shows the occurrence of a single event during $T_1$. An email with an attached document is sent to a competitor in the look-aside dictionary during this time division. This email is processed by the capture system and, accordingly, all three storages have an entry for that email. In the metadata data storage 1601, an entry for the email and an entry for the attached document are created. The look-aside storage 1603 has an entry noting that a particular competitor in the look-aside dictionary was sent the email. Finally, the email text and the attachment are saved in the object storage 1605.

FIG. 16(c) shows the occurrence of a two events during $T_3$. The first event is uploading an image to a web page using the HTTP protocol. As a result, there are entries in the image and protocol (HTTP) categories of the metadata storage 1601 and in the object storage 1605 during $T_3$. The second event of $T_3$ is an email being received with no attachments. Accordingly, an entry exists in the email category of the metadata storage 1601 and the email text is stored in the object storage 1605.

Figure 17:
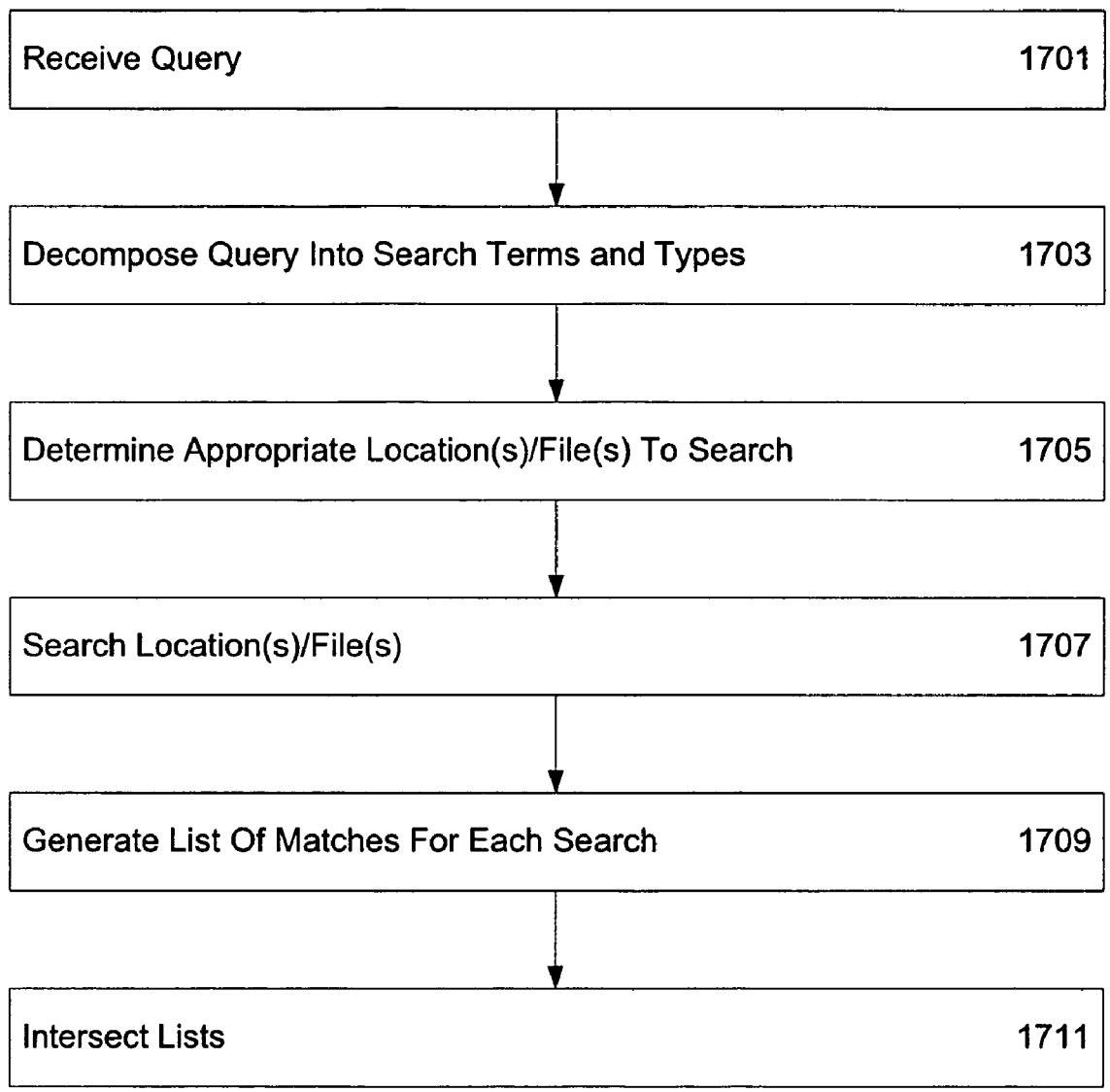
FIG. 17 illustrates an embodiment of a method for performing a query in a capture system.

FIG. 17 illustrates an embodiment of a method for performing a query in a capture system. At 1701, a query is received or generated. A received query normally comes into a capture system via a user interface. These queries are typically written in a form that is not standard to the capture system and must be further decomposed. An exemplary query is "Find a MS Office document over 50 KB in size with the keywords "Confidential" and "Project" in the document with a destination address of "Competitor1" or "Competitor2" that was sent between January 1 and January 3."

This query is decomposed into search terms and types at 1703. For each of these search terms, a list of matches to stored data will be generated. For the above example query, the decomposition results in six lists that will be generated: 1) attachments by time, content-type, and size; 2) keyword "Confidential;" 3) keyword "Project;" 4) email by time, content-type, and size; 5) keyword "Competitor1;" and 6) keyword "Competitor2." Of course, the exact decomposition may very. For example, keywords could be combined, etc. Search terms may also be tokenized depending upon where the search term is located. Tokens are used in the searching of the tag database as described earlier. The exact tokenization method (how strings of text are broken into individual tokens) is not important as long as that method is identical between the capture and searching portions of the device.

The appropriate location(s)/file(s) to search are determined at 1705. As described earlier, typical capture systems use different types of storage locations and types. The search terms decomposed at 1703 may relate to these storage locations and types (such as email or attachment) differently based on the context of the search query. For example, a search for a keyword may typically start with a search in a look-aside such as a dictionary. Since these searches (searches of look-asides) are generally fast, a quick determination of whether or not the capture system has ever searched for these keywords and if a corresponding entry in metadata would have been made. Whereas the appropriate search for attachments in general is the metadata storage or object storage. Typically, the metadata storage is searched prior to object storage because it would be faster.

The appropriate search location(s)/file(s) are searched at 1707. For example, a look-aside may be searched for a keyword and the metadata storage searched for an attachment over 50 KB in size. Some optimizations for searching may be utilized by a capture system. One optimization is to perform a "dirty search" such as only searching for a portion of a keyword. If the search has several requirements, and one fails, it may be beneficial to not have searched for the entire keyword. However, further refinements of the search may need to be performed at a later time (for example, if no other search requirements fail then the entire keyword will have to be searched for).

Another optimization is that if one term of an "OR" clause of a search has been found, then the other terms of the "OR" clause do not need to be searched for. For example, of the search is for "A or B" and "A" is found, then "B" does not need to be searched for because the clause has already been satisfied.

Another optimization is to first search the list of terms that could be in the metadata. If a particular value is not going to be in the metadata then the metadata should not be searched. In fact, if a value is not in the metadata the entire object storage may have to be searched for that value. This would be a relatively slower search. For example, a determination of whether or not a capture system was previously searching and creating metadata for the text "Butters" is generally faster than searching the metadata storage.

In an embodiment, searches are performed one time division at a time. For example, if the capture system has 24 time divisions (one division per hour of the day), each hour is searched individually. Search results from the same time division are more likely to be related than search results from different time divisions. For example, an email that meets the criteria of the exemplary search query is likely to be processed and have items (metadata and objects) stored in the same time division. Accordingly, search results from different time divisions are often not combinable. Searching by time division may result in a search time of faster than order n.

A list of matches for each search is generated at 1709. Lists of matches are subsets of what is stored in a particular storage location. For example, a list of matches from the metadata storage is those metadata that match the search criteria. If time divisions are used, then each list of matches is divided by time division.

The lists of matches for each search are intersected at 1711. Intersecting determines the result of the search. If time divisions are used, results from each list for a specific time division are intersected with results from the same time division.

Searching, matching, and intersecting may also be staggered so as to better utilize resources. For example, look-asides may be searched before metadata or object storage. If there is no match in a look-aside, it may not be useful to search the other databases as those searches would likely result in resource waste. Likewise, object storage may be searched prior to object storage.

Figure 18:
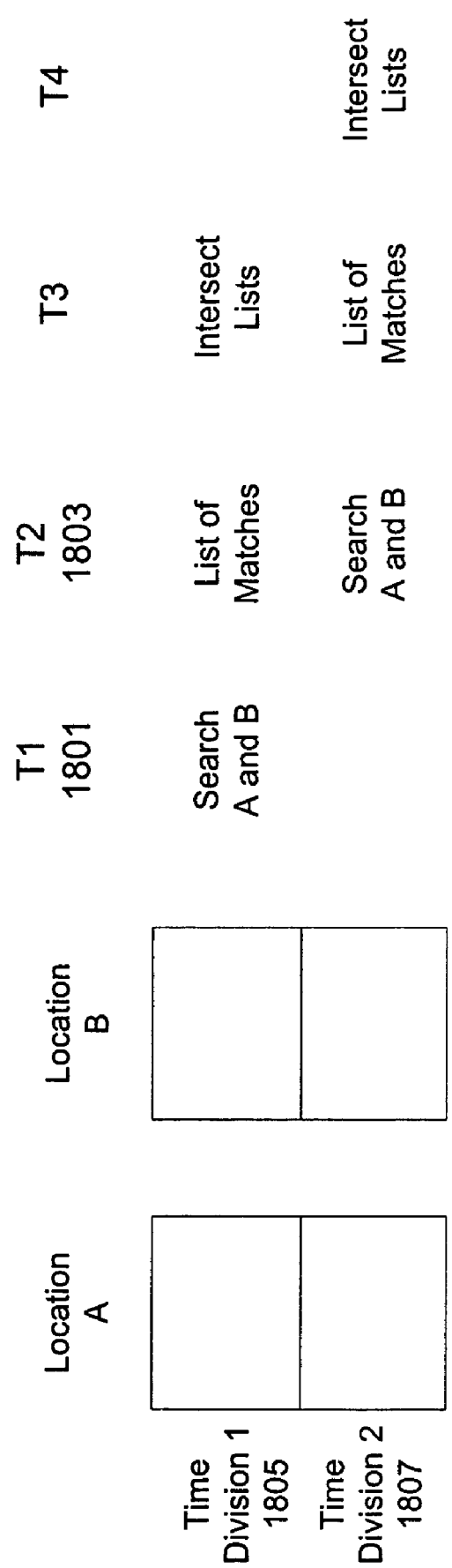
FIG. 18 illustrates pipeline staggering.

This staggering may also apply to searching, matching, and intersecting by time division in a "pipeline" fashion. FIG. 18 illustrates pipeline staggering. At time $T_1$ 1801, a first time slot 1805 is searched. At time $T_2$ 1803, a second time slot 1807 may be searched while a list (or lists) of matches is being generated for the first time slot, etc. The two staggering optimizations may also be combined.

Figure 19:
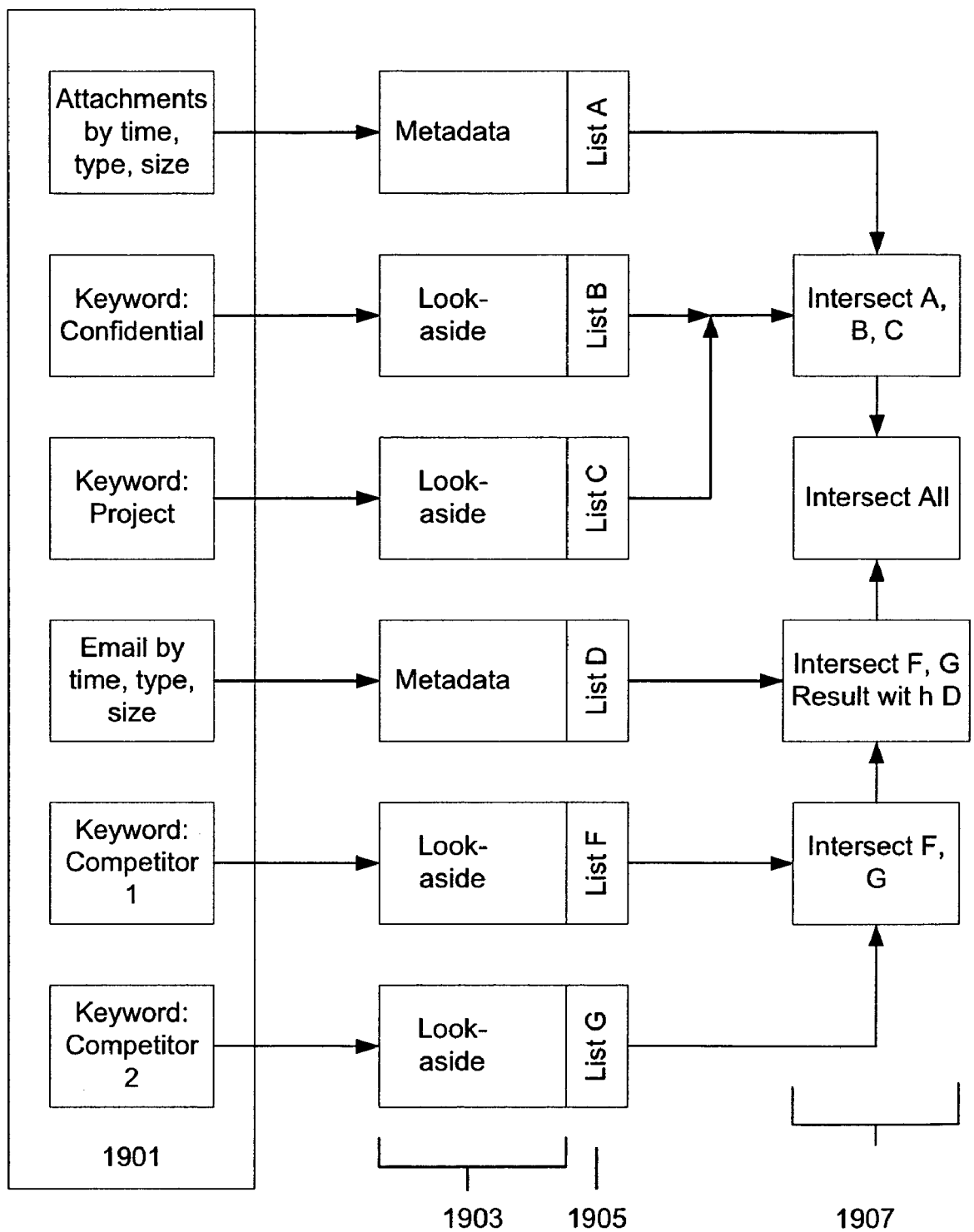
FIG. 19 illustrates the exemplary query being performed.

FIG. 19 illustrates the exemplary query being performed. This query may be made over a particular time division or over the entire time that the capture system was operating.

The query is broken into different keywords and search types at 1901. As shown, attachments and emails (by time, content, and size) and keywords will be searched for.

The appropriate storage locations have been determined at 1903. The metadata storage will be searched for attachments and emails, while the look-aside storage will be searched for keywords.

Lists have been generated based on a search of these locations at 1905. Lists A and D have been generated from the search of the metadata storage. Lists B, C, F, and G have been generated from searching the look-aside storage. As described above, the searching and generation of lists may be staggered. For example, the look-aside storage may be searched before searching the metadata storage. These searches and list generations may be performed by time division. The object storage may also have to be searched. For example, the object storage may have to be searched to retrieve an email to look for the destination address of "Competitor 1" or "Competitor 2."

Lists are intersected at 1907. Lists B and C are interested with A; F and G are intersected with D; and the results of those two previous intersections are intersected to create the final search result. Again, the timing of these intersections may be staggered.

Closing Comments

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In one embodiment, a capture system is an appliance constructed using commonly available computing equipment and storage systems capable of supporting the software requirements.

Figure 20:
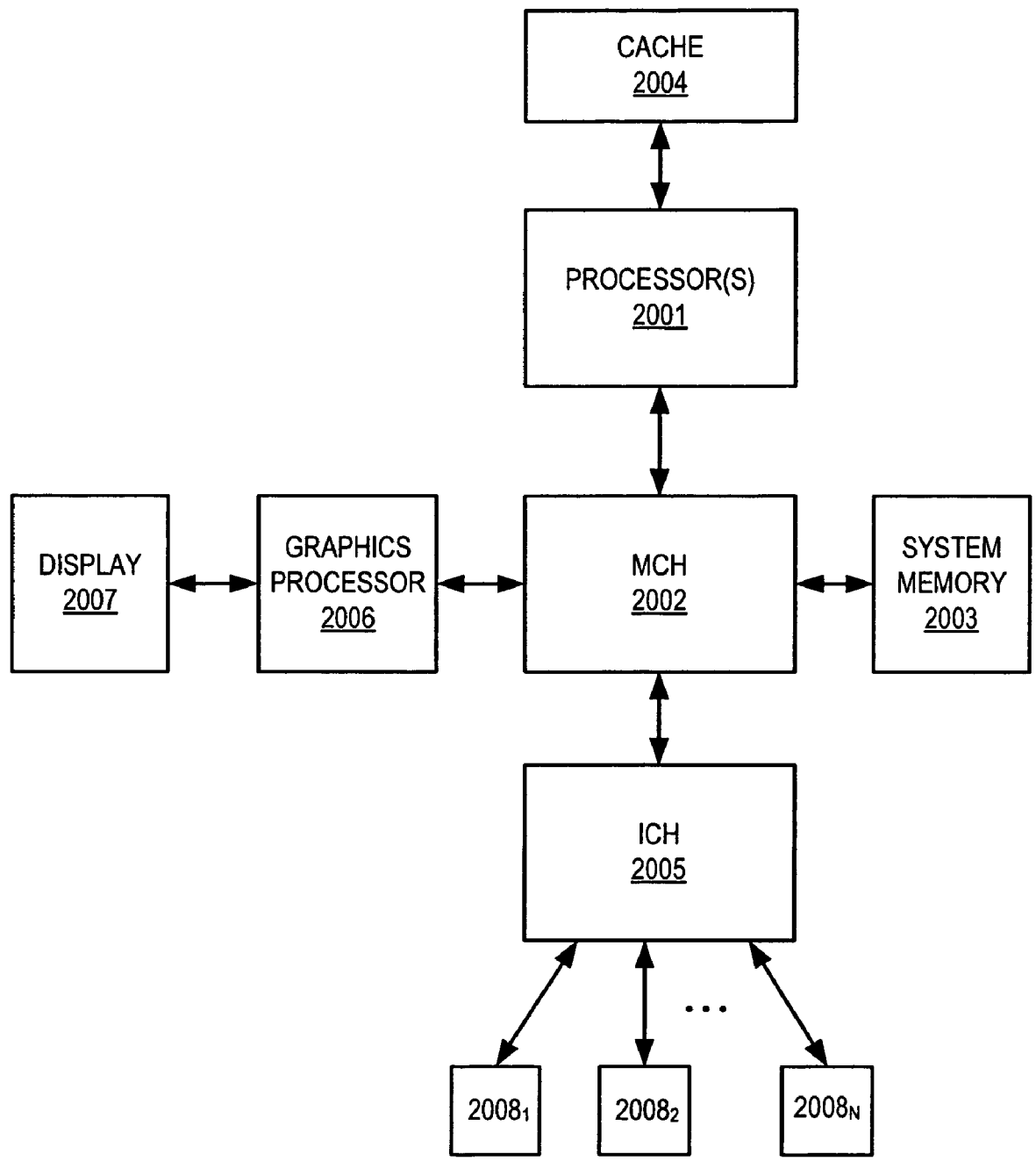
FIG. 20 shows an embodiment of a computing system.

FIG. 20 shows an embodiment of a computing system (e.g., a computer). The exemplary computing system of FIG. 20 includes: 1) one or more processors 2001; 2) a memory control hub (MCH) 2002; 3) a system memory 2003 (of which different types exist such as DDR RAM, EDO RAM, etc,); 4) a cache 2004; 5) an I/O control hub (ICH) 2005; 6) a graphics processor 2006; 7) a display/screen 2007 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2008.

The one or more processors 2001 execute instructions in order to perform whatever software routines the computing system implements. The instructions frequently involve some sort of operation performed upon data. Both data and instructions are stored in system memory 2003 and cache 2004. Cache 2004 is typically designed to have shorter latency times than system memory 2003. For example, cache 1304 might be integrated onto the same silicon chip(s) as the processor(s) and/or constructed with faster SRAM cells whilst system memory 2003 might be constructed with slower DRAM cells. By tending to store more frequently used instructions and data in the cache 2004 as opposed to the system memory 2003, the overall performance efficiency of the computing system improves.

System memory 2003 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2003 prior to their being operated upon by the one or more processor(s) 2001 in the implementation of a software program. Similarly, data that a software program determines should be sent from the computing system to an outside entity through one of the computing system interfaces, or stored into an internal storage element, is often temporarily queued in system memory 1303 prior to its being transmitted or stored.

The ICH 2005 is responsible for ensuring that such data is properly passed between the system memory 2003 and its appropriate corresponding computing system interface (and internal storage device if the computing system is so designed). The MCH 2002 is responsible for managing the various contending requests for system memory 2003 access amongst the processor(s) 2001, interfaces and internal storage elements that may proximately arise in time with respect to one another.

One or more I/O devices 2008 are also implemented in a typical computing system. I/O devices generally are responsible for transferring data to and/or from the computing system (e.g., a networking adapter); or, for large scale non-volatile storage within the computing system (e.g., hard disk drive). ICH 2005 has bi-directional point-to-point links between itself and the observed I/O devices 2008. A capture program, classification program, a database, a filestore, an analysis engine and/or a graphical user interface may be stored in a storage device or devices 2008 or in memory 2003.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules, may be implemented as software or hardware modules, combined, or without dividing their functionalities into modules at all. The present invention is not limited to any modular architecture either in software or in hardware, whether described above or not.

What is claimed is:

1. A method comprising:
    decomposing a capture system query into at least one search term;
    determining at least one location to search for the at least one search term;
    searching the at least one location for the at least one search term;
    generating a list of matches for each location searched; and
    intersecting the lists of matches, the capture system being configured to intercept data from data streams, reconstruct the data, and store network transmitted objects according to a capture rule that defines which objects are to be captured by the capture system, wherein the capture system is configured to allow a document to be forwarded from the capture system to its intended destination at a network node unless the capture rule prohibits forwarding the document based on the document including one or more objects.

2. The method of claim 1, further comprising:
    receiving the query at the capture system.

3. The method of claim 1, wherein the at least one location is selected from a group consisting of:
    a look-aside storage;
    a metadata database; and
    an object storage.

4. The method of claim 3, wherein the object storage is located outside of the capture system.

5. The method of claim 3, wherein the look-aside list has the highest search priority.

6. The method of claim 3, wherein the searching the at least one location for the at least one search term, generating a list of matches for each location searched, and intersecting the lists of matches are performed in a pipelined fashion.

7. The method of claim 3, wherein the look-aside storage, metadata storage, and object storage are pre-sorted by time.

8. The method of claim 7, wherein the time is partitioned into divisions.

9. An article of manufacture including program code which, when executed by a machine, causes the machine to perform a method, the method comprising:
    decomposing a capture system query into at least one search term;
    determining at least one location to search for the at least one search term;
    searching the at least one location for the at least one search term;
    generating a list of matches for each location searched; and
    intersecting the lists of matches, the capture system being configured to intercept data from data streams, reconstruct the data, and store network transmitted objects according to a capture rule that defines which objects are to be captured by the capture system, wherein the capture system is configured to allow a document to be forwarded from the capture system to its intended destination at a network node unless the capture rule prohibits forwarding the document based on the document including one or more objects.

10. The article of manufacture of claim 9, further comprising:
    receiving the query at the capture system.

11. The article of manufacture of claim 9, wherein the at least one location is selected from a group consisting of:
    a look-aside storage;
    a metadata database; and
    an object storage.

12. The article of manufacture of claim 11, wherein the object storage is located outside of the capture system.

13. The article of manufacture of claim 11, wherein the look-aside list has the highest search priority.

14. The article of manufacture of claim 11, wherein the searching the at least one location for the at least one search term, generating a list of matches for each location searched, and
    intersecting the lists of matches are performed in a pipelined fashion.

15. The article of manufacture of claim 11, wherein the look-aside storage, metadata storage, and object storage are pre-sorted by time.

16. The article of manufacture of claim 15, wherein the time is partitioned into divisions.

* * * * *